US012712700B2

(12) United States Patent
Zhang et al.

(10) Patent No.: US 12,712,700 B2

(45) Date of Patent: Aug. 18, 2026

(54) SEMI-STATIC AND DYNAMIC SUBBAND CONFIGURATION

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US); Abdelrahman Mohamed Ahmed Mohamed Ibrahim, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1093 days.

(21) Appl. No.: 17/808,184

(22) Filed: Jun. 22, 2022

(65) Prior Publication Data

US 2023/0421336 A1 Dec. 28, 2023

(51) Int. Cl.

*H04L 5/00* (2006.01)
*H04L 5/14* (2006.01)
*H04W 72/23* (2023.01)

(52) U.S. Cl.

CPC .......... *H04L 5/0092* (2013.01); *H04L 5/0094* (2013.01); *H04L 5/14* (2013.01); *H04W 72/23* (2023.01)

(58) Field of Classification Search

CPC ....... H04L 5/0092; H04L 5/0094; H04L 5/14; H04W 72/23

See application file for complete search history.

(56) References Cited

U.S. PATENT DOCUMENTS

2021/0320779 A1 10/2021 Huang et al.
2021/0352667 A1 11/2021 Abotabl et al.
2021/0360664 A1* 11/2021 Fakoorian ......... H04W 72/1273
2022/0007395 A1 1/2022 Lei et al.

(Continued)

OTHER PUBLICATIONS

International Search Report and Written Opinion—PCT/US2023/067507—ISA/EPO—Sep. 15, 2023 (2205037WO).

*Primary Examiner* — Siming Liu

(74) *Attorney, Agent, or Firm* — Norton Rose Fulbright US LLP

(57) ABSTRACT

This disclosure provides systems, methods, and devices that support subband full duplex configuration for wireless communication. Semi-static configuration of one or more downlink subbands, one or more uplink subbands, and one or more guard bands may be implemented via RRC signaling configured for subband full duplex communication. The RRC signaling may include subband frequency configuration pattern information and subband symbol and slot time configuration pattern information. Dynamic configuration of one or more downlink subbands, one or more uplink subbands, and one or more guard bands may be implemented by RRC signaling in combination with MAC-CE and/or DCI signaling. The RRC signaling may preconfigure wireless communications devices with a plurality of subband frequency configuration patterns and a plurality of subband symbol and slot time configuration patterns. The MAC-CE and/or DCI signaling may select and/or activate one or more subband frequency configuration patterns. Other aspects and features are also claimed and described.

28 Claims, 14 Drawing Sheets

Transmit RRC signaling including subband frequency configuration pattern information for subband full duplex communication and subband symbol and slot time configuration pattern information for subband full duplex communication

1001

Communicate via at least one uplink and at least one downlink of a subband full duplex communication session in accordance with at least one subband frequency configuration pattern corresponding to the subband frequency configuration pattern information and at least one subband symbol and slot time configuration pattern corresponding to the subband symbol and slot time configuration pattern information

1002

(56) References Cited

U.S. PATENT DOCUMENTS

| | | | | |
|---|---|---|---|---|
| 2023/0007641 | A1 * | 1/2023 | Kim | H04W 72/044 |
| 2023/0284155 | A1 * | 9/2023 | Shim | H04W 84/04 370/329 |

* cited by examiner

810

811 812

| Index | Subband Frequency Configuration Pattern |
|---|---|
| 1 | (Subband Frequency Configuration Pattern Information 1) |
| 2 | (Subband Frequency Configuration Pattern Information 2) |
| 3 | (Subband Frequency Configuration Pattern Information 3) |
| 4 | (Subband Frequency Configuration Pattern Information 4) |
| 5 | (Subband Frequency Configuration Pattern Information 5) |
| ... | ... |

| Index | Subband Slot and Symbol Time Configuration Pattern |
|---|---|
| A | (Subband Slot and Symbol Time Configuration Pattern Information A) |
| B | (Subband Slot and Symbol Time Configuration Pattern Information B) |
| ... | ... |

SEMI-STATIC AND DYNAMIC SUBBAND CONFIGURATION

TECHNICAL FIELD

Aspects of the present disclosure relate generally to wireless communication systems, and more particularly, to full duplex communication. Some features may enable and provide improved communications, including subband full duplex configuration for wireless communication.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communications devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

A full duplex mode, in which one or more wireless communications devices simultaneously transmit and receive on the same slot, may be utilized for facilitating various efficiencies in wireless communications, such as enhanced capacity, resource utilization, or spectrum efficiency. Full duplex mode implementations, however, often introduce issues with respect to various forms of interference and clutter. For example, a wireless communications device operating in a full duplex mode may experience self-interference from its signal transmission to its signal reception. Additionally, a wireless communications device transmitting and/or receiving signals according to a full duplex mode implementation may experience clutter (e.g., received reflected instances of the transmitted signal) associated with the full duplex communication. Full duplex communications may thus pose challenges in realizing desired efficiencies in any particular implementation.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication may include transmitting radio resource control (RRC) signaling including subband frequency configuration pattern information for subband full duplex communication and subband symbol and slot time configuration pattern information for subband full duplex communication. According to some aspects, the method also includes communicating via at least one uplink and at least one downlink of a subband full duplex communication session in accordance with at least one subband frequency configuration pattern corresponding to the subband frequency configuration pattern information and at least one subband symbol and slot time configuration pattern corresponding to the subband symbol and slot time configuration pattern information.

In an additional aspect of the disclosure, an apparatus includes at least one processor and a memory coupled to the at least one processor. The at least one processor may be configured according to aspects to transmit RRC signaling including subband frequency configuration pattern information for subband full duplex communication and subband symbol and slot time configuration pattern information for subband full duplex communication. According to some aspects, the at least one processor may also be configured to communicate via at least one uplink and at least one downlink of a subband full duplex communication session in accordance with at least one subband frequency configuration pattern corresponding to the subband frequency configuration pattern information and at least one subband symbol and slot time configuration pattern corresponding to the subband symbol and slot time configuration pattern information.

In an additional aspect of the disclosure, an apparatus may include means for transmitting RRC signaling including subband frequency configuration pattern information for subband full duplex communication and subband symbol and slot time configuration pattern information for subband full duplex communication. According to some aspects, the apparatus may also include means for communicating via at least one uplink and at least one downlink of a subband full duplex communication session in accordance with at least one subband frequency configuration pattern corresponding to the subband frequency configuration pattern information and at least one subband symbol and slot time configuration pattern corresponding to the subband symbol and slot time configuration pattern information.

In an additional aspect of the disclosure, a non-transitory computer-readable medium stores instructions that, when executed by a processor, cause the processor to perform operations. The operations may include transmitting RRC signaling including subband frequency configuration pattern information for subband full duplex communication and subband symbol and slot time configuration pattern information for subband full duplex communication. According to some aspects, the operations may also include communicating via at least one uplink and at least one downlink of a subband full duplex communication session in accordance with at least one subband frequency configuration pattern corresponding to the subband frequency configuration pattern information and at least one subband symbol and slot time configuration pattern corresponding to the subband symbol and slot time configuration pattern information.

In one aspect of the disclosure, a method for wireless communication may include receiving RRC signaling including subband frequency configuration pattern information for subband full duplex communication and subband symbol and slot time configuration pattern information for subband full duplex communication, and determining at least one subband frequency configuration pattern based on the subband frequency configuration pattern information and at least one subband symbol and slot time configuration pattern based on the subband symbol and slot time configuration pattern information. According to some aspects the method may also include communicating via at least one uplink or downlink of a subband full duplex communication session in accordance with the at least one subband frequency configuration pattern and the at least one subband symbol and slot time configuration pattern.

In an additional aspect of the disclosure, an apparatus includes at least one processor and a memory coupled to the at least one processor. The at least one processor may be configured to receive RRC signaling including subband frequency configuration pattern information for subband full duplex communication and subband symbol and slot time configuration pattern information for subband full duplex communication, and to determine at least one subband frequency configuration pattern based on the subband frequency configuration pattern information and at least one subband symbol and slot time configuration pattern based on the subband symbol and slot time configuration pattern information. According to some aspects, the at least one processor may also be configured to communicate via at least one uplink or downlink of a subband full duplex communication session in accordance with the at least one subband frequency configuration pattern and the at least one subband symbol and slot time configuration pattern.

In an additional aspect of the disclosure, an apparatus may include means for receiving RRC signaling including subband frequency configuration pattern information for subband full duplex communication and subband symbol and slot time configuration pattern information for subband full duplex communication, and means for determining at least one subband frequency configuration pattern based on the subband frequency configuration pattern information and at least one subband symbol and slot time configuration pattern based on the subband symbol and slot time configuration pattern information. According to some aspects, the apparatus may also include means for communicating via at least one uplink or downlink of a subband full duplex communication session in accordance with the at least one subband frequency configuration pattern and the at least one subband symbol and slot time configuration pattern.

In an additional aspect of the disclosure, a non-transitory computer-readable medium stores instructions that, when executed by a processor, cause the processor to perform operations. The operations may include receiving RRC signaling including subband frequency configuration pattern information for subband full duplex communication and subband symbol and slot time configuration pattern information for subband full duplex communication, and determining at least one subband frequency configuration pattern based on the subband frequency configuration pattern information and at least one subband symbol and slot time configuration pattern based on the subband symbol and slot time configuration pattern information. According to some aspects, the operations may also include communicating via at least one uplink or downlink of a subband full duplex communication session in accordance with the at least one subband frequency configuration pattern and the at least one subband symbol and slot time configuration pattern.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communications devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 8A illustrates subband frequency configuration pattern information according to one or more aspects.

FIG. 8B illustrates subband symbol and slot time configuration information according to one or more aspects.

Like reference numbers and designations in the various drawings indicate like elements.

DETAILED DESCRIPTION

Figure 1:
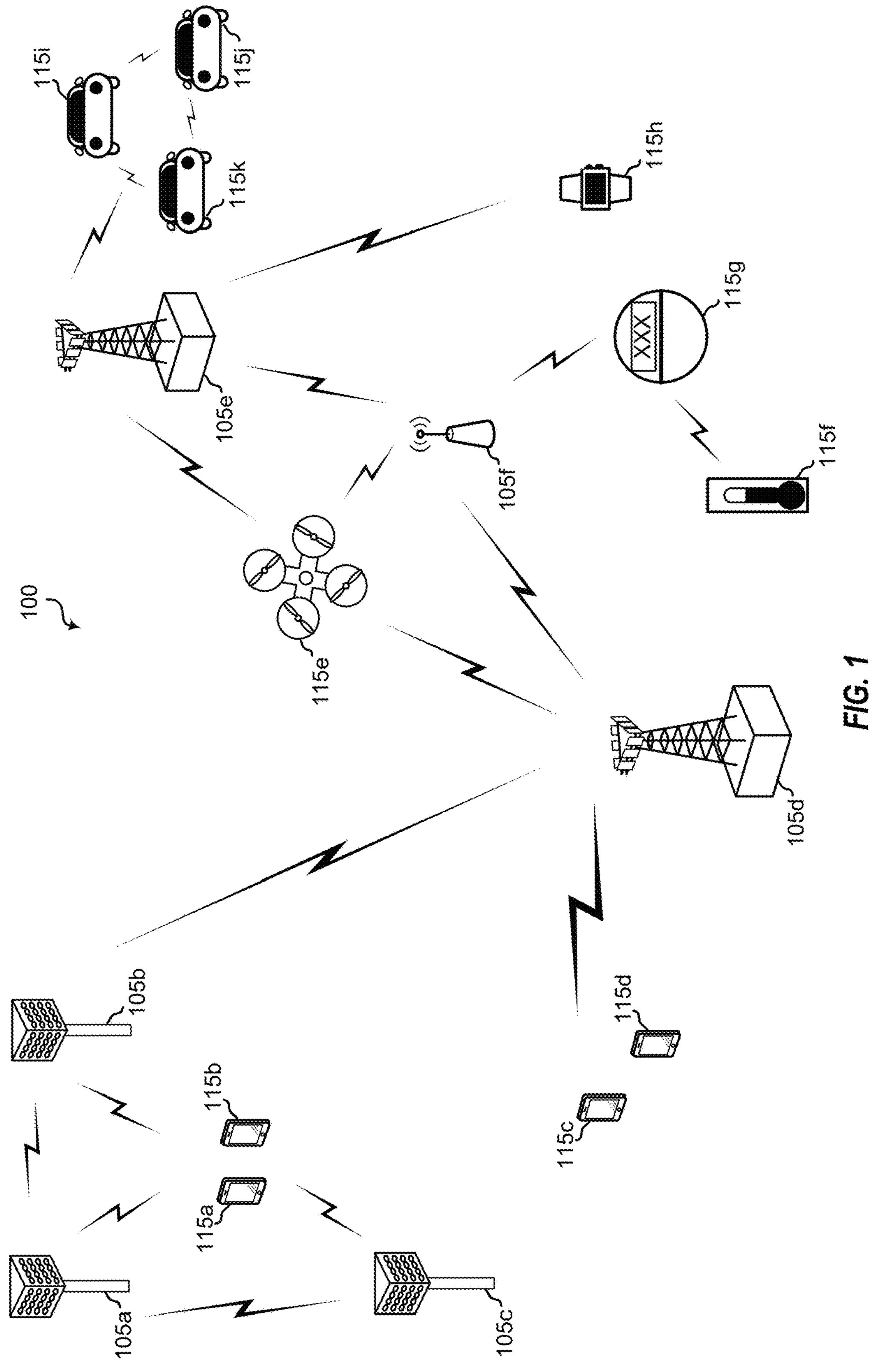
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support subband full duplex configuration for wireless communication. In supporting subband full duplex operation according to some examples, semi-static configuration of one or more downlink subbands, one or more uplink subbands, and one or more guard bands may be implemented via radio resource control (RRC) signaling configured for subband full duplex communication. The RRC signaling may, for example, include subband frequency configuration pattern information and subband symbol and slot time configuration pattern information used in implementing semi-static subband full duplex communication. In supporting subband full duplex operation according to further examples, dynamic configuration of one or more downlink subbands, one or more uplink subbands, and one or more guard bands may be implemented by RRC signaling in combination with media access control-control element (MAC-CE) and/or downlink control information (DCI) signaling. The RRC signaling may, for example, include subband frequency configuration pattern information and subband symbol and slot time configuration pattern information used in preconfiguring wireless communications devices with a plurality of subband frequency configuration patterns and a plurality of subband symbol and slot time configuration patterns for subband full duplex operation. The MAC-CE and/or DCI signaling may select and/or activate one or more subband frequency configuration patterns of the plurality of subband frequency configuration patterns and one or more subband symbol and slot time configuration patterns of the plurality of subband symbol and slot time configuration patterns used in implementing dynamic subband full duplex communication. According to aspects of the disclosure, the signaling configured for subband full duplex communication (e.g., RRC signaling, MAC-CE signaling, and/or DCI signaling) configured for subband full duplex communication may include subband full duplex slot periodicity information for the subband full duplex communication. The signaling configured for subband full duplex communication may additionally or alternatively include subband full duplex slot offset information for the subband full duplex communication.

Particular implementations of the subject matter described in this disclosure may be implemented to realize one or more of the following potential advantages or benefits. In some aspects, the present disclosure provides techniques for subband full duplex for wireless communication providing subband full duplex configurations for mitigating or avoiding issues with respect to various forms of interference and clutter. Semi-static subband full duplex configurations and/or dynamic subband full duplex configurations according to examples of the disclosure may be selectively implemented with respect to particular situations, communication environments, channel conditions, etc. to enable and provide improved communications. Implementations of subband full duplex configurations according to concepts of the present disclosure provide increases uplink duty cycle leading to latency reduction (e.g., downlink signals may be received in slots otherwise designated as uplink only slots by slot format information, which can enable latency savings), uplink coverage improvement, etc. Additionally or alternatively, implementations of subband full duplex configurations according to concepts herein provide enhanced system capacity, resource utilization, and/or spectrum efficiency, enable flexible and dynamic uplink/downlink resource adaption according to uplink/downlink traffic in a robust manner, etc.

This disclosure relates generally to providing or participating in authorized shared access between two or more wireless communications devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communications devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations **105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f*** is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
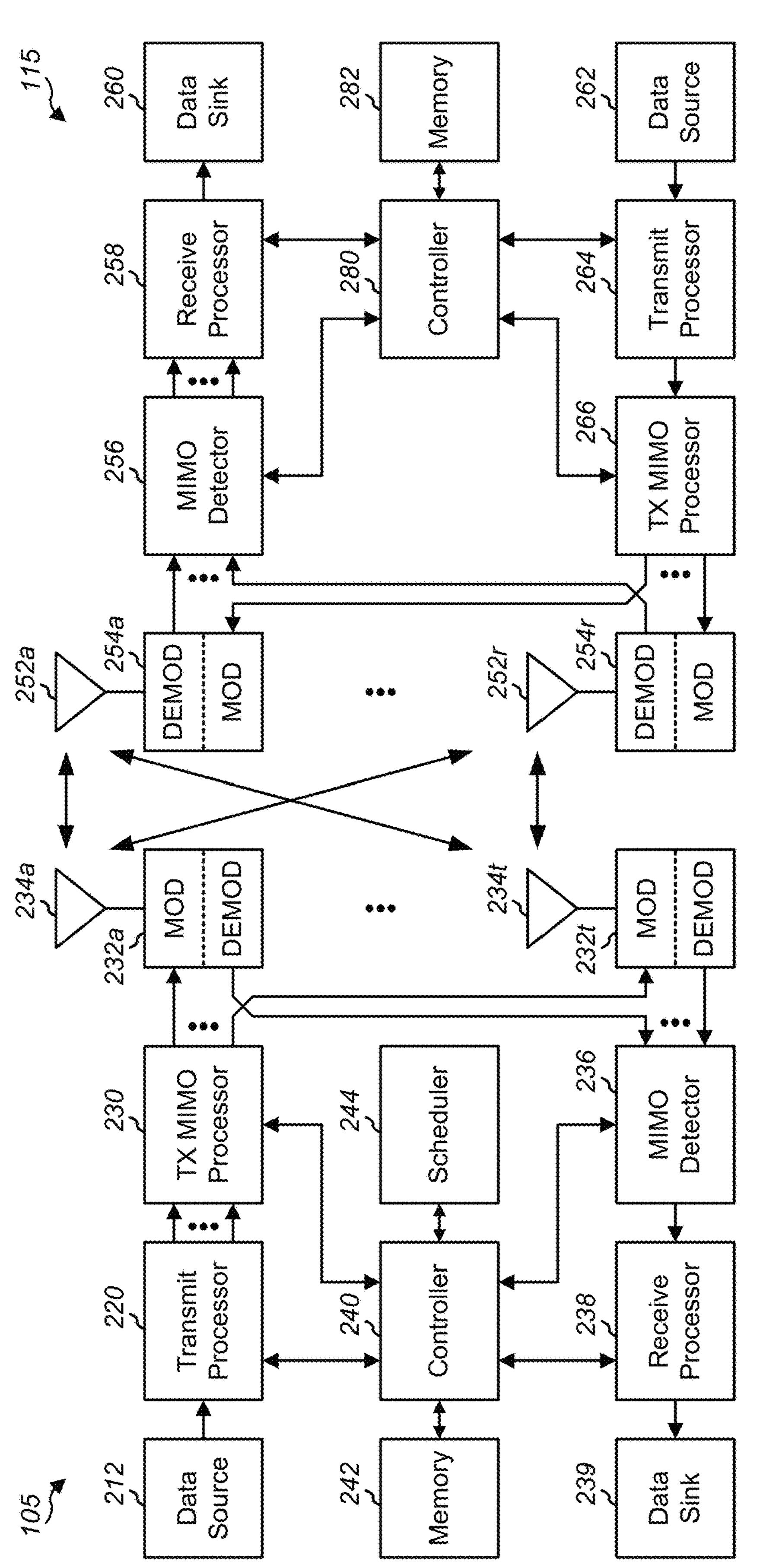
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 9 and 11, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
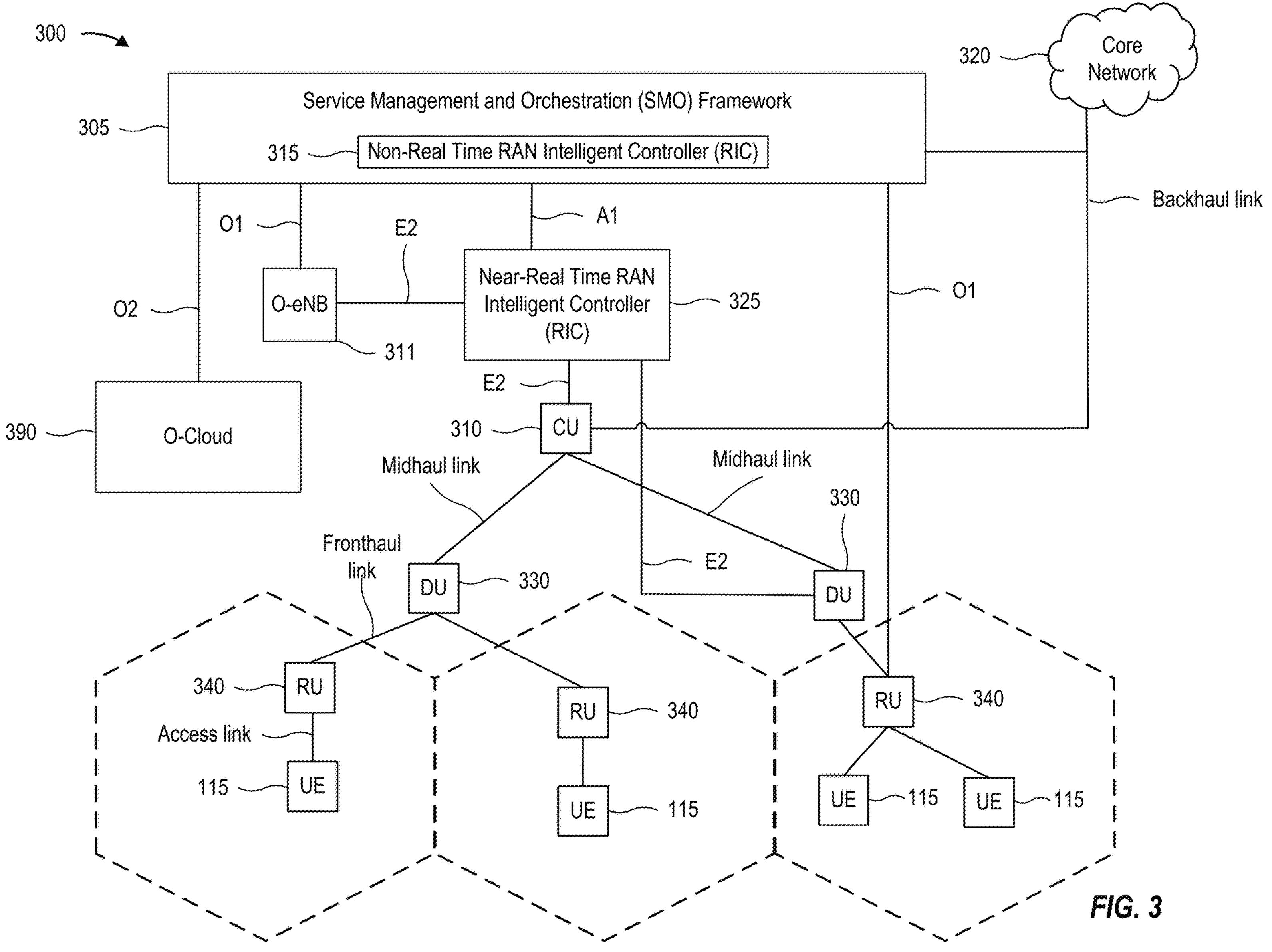
FIG. 3 is a block diagram illustrating an example disaggregated base station architecture according to one or more aspects.

FIG. 3 shows a diagram illustrating an example disaggregated base station architecture 300, such as may be implemented by one or more of base stations 105. The disaggregated base station architecture 300 may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 115 via one or more RF access links. In some implementations, the UE 115 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 115. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

Figures 4A, 4B, 4C:
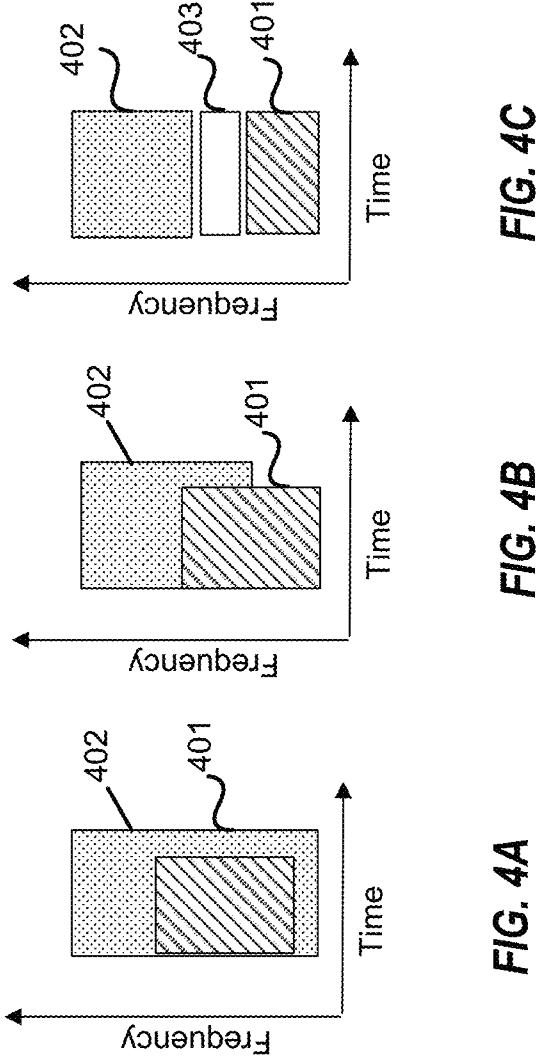
FIGS. 4A-4C illustrate various configurations of duplex modes as may be utilized by wireless communications stations according to one or more aspects.

Various wireless communications devices (e.g., one or more of UEs 115 and/or base station 105) of wireless network 100 may operate in half duplex mode or full duplex mode. FIGS. 4A-4C illustrate various configurations of full duplex modes in a single bandwidth part (BWP) or component carrier (CC) as may be utilized by wireless communications devices of wireless network 100. It should be appreciated that FIGS. 4A-4C present examples with respect to duplex mode configurations that may be utilized and are not intended to be limiting with respect to the particular configurations that may be utilized by wireless communications devices that may implement full duplex operation according to concepts of the disclosure.

As can be seen in FIGS. 4A-4C, uplink signals 401 of the full duplex modes overlap downlink signals 402 in time. That is, in these examples, a wireless communications devices implementing a full duplex mode with respect to wireless communications transmits and receives at the same time. A wireless communications device may implement a full duplex mode for communication with one or more other wireless communications devices also operating in the full duplex mode (e.g., each such wireless communications device transmitting and receiving at the same time). Additionally or alternatively, a wireless communications device may implement a full duplex mode for communication with one or more wireless communications devices operating in a half duplex mode (e.g., although the wireless communications device operating in the full duplex mode may transmit and receive at the same time, wireless communications devices operating in the half duplex mode may either transmit or receive at any particular time, such as where one wireless communications device operating in the half duplex mode receives downlink signals from the wireless communications device operating in the full duplex mode simultaneously with another wireless communications device operating in the half duplex mode transmits uplink signals to the wireless communications device operating in the full duplex mode).

Various configurations may be utilized with respect to a full duplex mode, as represented by the examples of FIGS. 4A-4C. For example, FIGS. 4A and 4B show examples of in-band full duplex, wherein uplink signals 401 of the full duplex modes overlap downlink signals 402 in time and frequency. That is the uplink signals and downlink signals at least partially share the same time and frequency resource (e.g., full or partial overlap of the uplink and downlink signals in the time and frequency domains). In another configuration of a full duplex mode, FIG. 4C shows an example of subband full duplex, wherein uplink signal 401 of the full duplex mode overlaps downlink signal 402 in time, but not in frequency. That is the uplink signals and downlink signals at least partially share the same time resource (e.g., full or partial overlap of the uplink and downlink signals in the time domain), but do not share the same frequency resource. In the example illustrated in FIG. 4C, uplink signal 401 and downlink signal 402 are separated in the frequency domain by guard band 403 (e.g., a relatively narrow amount of frequency spectrum separating the frequency band occupied by the uplink and downlink signals).

Figure 5:
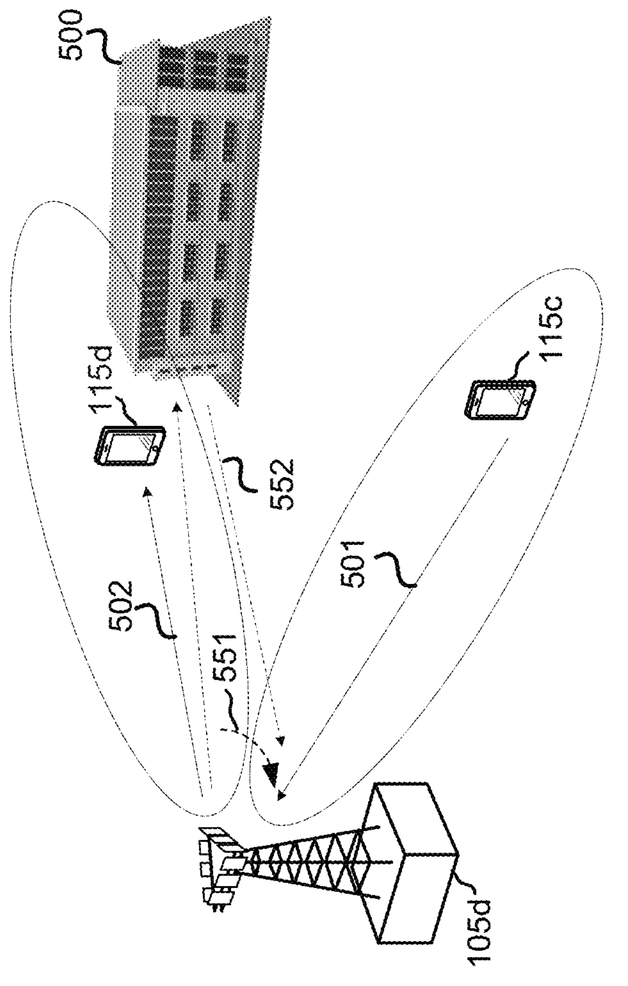
FIG. 5 is a block diagram illustrating a portion of an example wireless communication system experiencing self-interference and clutter associated with full duplex mode operation.

Operation in a full duplex mode, although facilitating various efficiencies in wireless communications (e.g., enhanced capacity, resource utilization, and/or spectrum efficiency), often introduce issues with respect to various forms of interference and clutter. FIG. 5 represents a portion of wireless network 100 selected for illustrating self-interference and clutter associated with full duplex mode operation. In particular, FIG. 5 illustrates an example full duplex mode implementation in which base station 105*d* is operating in a full duplex mode while UEs 115*c* and 115*d* are each operating in a half duplex mode. It should be appreciated, however, that the particular base station and UEs depicted are not intended to be limiting with respect to the various wireless communication stations that may be subject to self-interference and/or clutter or that may implement subband full duplex-configuration and subband full duplex communications according to concepts of the disclosure. In the example of FIG. 5, base station 105*d* receives uplink signal 501 and transmits downlink signal 502 using a shared time resource. Accordingly, in addition to external interference (e.g., interference from other wireless devices operating in or near the coverage area of base station 105*d*), base station 105*d* may experience self-interference 551 associated with transmission of downlink signal 502 when attempting to receive uplink signal 501. Base station 105*d* may additionally experience clutter 552, such as may result from downlink signal 502 having been reflected off of feature 500 (e.g., a topological feature, such as a building, terrain, etc. disposed in or near the service area of base station 105*d*) and returned to base station 105*d* when attempting to receive uplink signal 501. Full duplex communications may thus pose challenges in realizing desired efficiencies in any particular implementation. Aspects of the present disclosure provide techniques for subband full duplex for wireless communication providing subband full duplex configurations, such as may be selectively implemented with respect to particular situations, communication environments, channel conditions, etc. for mitigating or avoiding issues with respect to various forms of interference and clutter.

Figure 6:
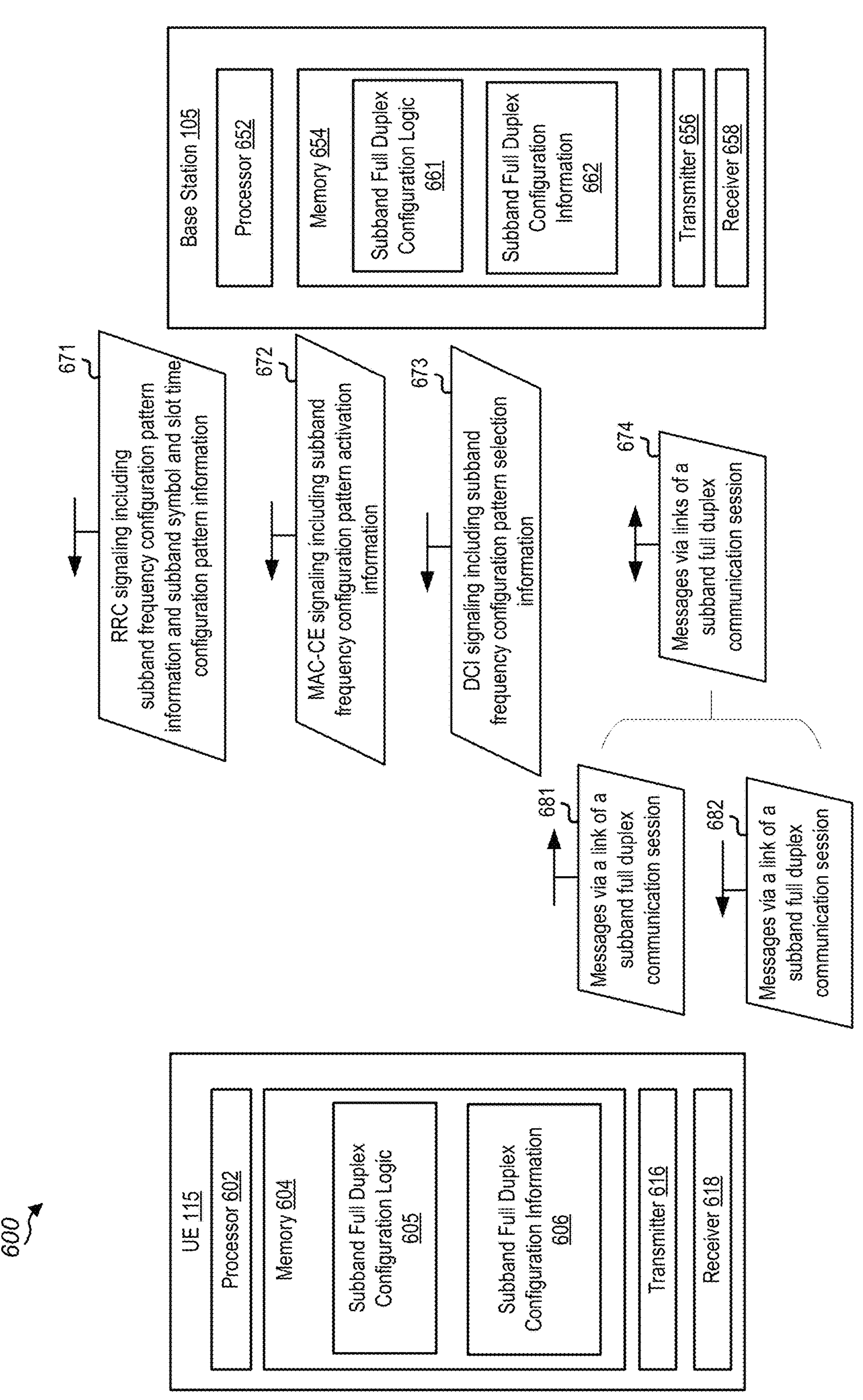
FIG. 6 is a block diagram illustrating a portion of an example wireless communication system that supports subband full duplex configuration according to one or more aspects.

FIG. 6 is a block diagram of an example wireless communications system 600 that supports subband full duplex configuration and communication according to one or more aspects of the disclosure. In some examples, wireless communications system 600 may implement aspects of wireless network 100. For example, wireless communications system 600 may implement a 5G NR network. The illustrated example of wireless communications system 600 includes UE 115 and base station 105, such as may correspond to an instance of a base station and UE of wireless network 100 shown in FIG. 1. Although one UE 115 and one base station 105 are illustrated, in some other implementations, wireless communications system 600 may include multiple UEs 115, and may include more than one base station 105. For example, wireless communications system 600 may include multiple 5G-capable UEs 115 and multiple 5G-capable base stations 105, such as UEs and base stations configured to operate in accordance with a 5G NR network protocol such as that defined by the 3GPP.

Base station 105 may include a variety of components (such as structural, hardware components) used for carrying out one or more functions described herein. For example, these components may include one or more processors 652 (hereinafter referred to collectively as "processor 652"), one or more memory devices 654 (hereinafter referred to collectively as "memory 654"), one or more transmitters 656 (hereinafter referred to collectively as "transmitter 656"), and one or more receivers 658 (hereinafter referred to collectively as "receiver 658"). Processor 652 may be configured to execute instructions stored in memory 654 to perform the operations described herein. In some implementations, processor 652 includes or corresponds to one or more of receive processor 238, transmit processor 220, and controller 240, and memory 654 includes or corresponds to memory 242.

Memory 654 includes or is configured to store subband full duplex configuration logic 661 and subband full duplex configuration information 662 according to aspects of the disclosure. Subband full duplex configuration logic 661 may comprise program code which, when executed by processor 652, causes base station 105 and/or components thereof to perform subband full duplex functions as described herein.

Subband full duplex configuration logic 661 may, when executed by processor 652, utilize various information stored as subband full duplex configuration information 662 (e.g., subband frequency configuration pattern information, subband symbol and slot time configuration pattern information, subband full duplex slot periodicity information, and/or subband full duplex slot offset information) for selecting and/or establishing one or more subband full duplex configurations to be utilized with respect to a particular situation, communication environment, channel conditions, etc. Subband full duplex configuration logic 661 of some examples may thus cause base station 105 to transmit (e.g., via transmitter 656) RRC signaling 671 including subband frequency configuration pattern information subband symbol and slot time configuration pattern information for configuring one or more wireless communications devices (e.g., UEs 115) for subband full duplex communication. RRC signaling 671 may, for example, include subband frequency configuration pattern information and subband symbol and slot time configuration pattern information used in implementing semi-static subband full duplex communication. RRC signaling 671 may additionally or alternatively include subband frequency configuration pattern information and subband symbol and slot time configuration pattern information used in preconfiguring wireless communications devices with a plurality of subband frequency configuration patterns and a plurality of subband symbol and slot time configuration patterns for dynamic subband full duplex operation. Subband full duplex configuration logic 661 of some examples may thus cause base station 105 to transmit (e.g., via transmitter 656) MAC-CE signaling 672 and/or DCI signaling 673 to control one or more wireless communications devices (e.g., UEs 115) with respect to selecting and/or activating one or more subband frequency configuration patterns of the plurality of subband frequency configuration patterns and one or more subband symbol and slot time configuration patterns of the plurality of subband symbol and slot time configuration patterns for dynamic subband full duplex communication.

The signaling for subband full duplex communication (e.g., RRC signaling 671, MAC-CE signaling 672, and/or DCI signaling 673) transmitted by base station 105 may, according to some examples, include subband full duplex slot periodicity information for the subband full duplex communication. The signaling configured for subband full duplex communication transmitted by base station 105 may additionally or alternatively include subband full duplex slot offset information for the subband full duplex communication.

After one or more wireless communications devices have been configured for subband full duplex configuration (e.g., provided appropriate subband full duplex configuration information via RRC signaling 671, MAC-CE signaling 672, and/or DCI signaling 673), program code of subband full duplex configuration logic 661, when executed by processor 652, may cause base station 105 and/or components thereof to communicate (e.g., via transmitter 656 and receiver 658) messages 674 (e.g., control and/or user data, payload data, etc.) via at least one uplink and at least one downlink of a subband full duplex communication session. For example, base station 105 may engage in subband full duplex communication session communications via one or more uplinks and one or more downlinks established with respect one or more UEs 115 using a subband full duplex communication configuration in accordance with at least one subband frequency configuration pattern corresponding to the subband frequency configuration pattern information and at least one subband symbol and slot time configuration pattern corresponding to the subband symbol and slot time configuration pattern information. According to some aspects, base station 105 may operate in the full duplex mode (e.g., uplink/downlink multi-user MIMO (MU-MIMO)) to transmit and receive messages (e.g., messages 674 comprising uplink and downlink messages, such as may correspond to uplink signal 501 and downlink signal 502 of FIG. 5) at the same time to/from UEs operating in half duplex mode (e.g., uplink MU-MIMO and downlink MU-MIMO). For example, a first UE may transmit messages (e.g., messages 681 comprising uplink messages of messages 674, and as may correspond to uplink signal 501 of FIG. 5) to base station 105 at the same time as a second UE receiving messages (e.g., messages 682 comprising downlink messages of messages 674, and as may correspond to downlink signal 502 of FIG. 5) transmitted by base station 105 operating in the full duplex mode using a subband full duplex communication configuration in accordance with at least one subband frequency configuration pattern corresponding to the subband frequency configuration pattern information and at least one subband symbol and slot time configuration pattern corresponding to the subband symbol and slot time configuration pattern information.

Transmitter 656 is configured to transmit reference signals, synchronization signals, control information and data to one or more other devices, and receiver 658 is configured to receive reference signals, control information and data from one or more other devices. For example, transmitter 656 may transmit signaling and/or control information (e.g., RRC signaling 671, MAC-CE signaling 672, DCI signaling 673, etc.) and data (e.g., one or more messages of messages 674) to, and receiver 658 may receive signaling and/or control information and data (e.g., one or more messages of messages 674) from, UE 115. In some implementations, transmitter 656 and receiver 658 may be integrated in one or more transceivers. Additionally or alternatively, transmitter 656 or receiver 658 may include or correspond to one or more components of base station 105 described with reference to FIG. 2.

UE 115 may include a variety of components (such as structural, hardware components) used for carrying out one or more functions described herein. For example, these components may include one or more processors 602 (hereinafter referred to collectively as "processor 602"), one or more memory devices 604 (hereinafter referred to collectively as "memory 604"), one or more transmitters 616 (hereinafter referred to collectively as "transmitter 616"), and one or more receivers 618 (hereinafter referred to collectively as "receiver 618"). Processor 602 may be configured to execute instructions stored in memory 604 to perform the operations described herein. In some implementations, processor 602 includes or corresponds to one or more of receive processor 258, transmit processor 264, and controller 280, and memory 604 includes or corresponds to memory 282.

Memory 604 includes or is configured to store subband full duplex configuration logic 605 and subband full duplex configuration information 606 according to aspects of the disclosure. Subband full duplex configuration logic 661 may comprise program code which, when executed by processor 652, causes base station 105 and/or components thereof to perform subband full duplex functions as described herein.

Subband full duplex configuration logic 605 may, when executed by processor 602, utilize various information stored as subband full duplex configuration information 606 (e.g., subband frequency configuration pattern information, subband symbol and slot time configuration pattern information, subband full duplex slot periodicity information, and/or subband full duplex slot offset information) for determining, selecting, and/or activating one or more subband full duplex configurations utilized with respect to a particular situation, communication environment, channel conditions, etc. Subband full duplex configuration logic 605 of some examples may thus cause UE 115 to receive (e.g., via receiver 618) RRC signaling 671 including subband frequency configuration pattern information subband symbol and slot time configuration pattern information for configuring the UE for subband full duplex communication. As described above, RRC signaling 671 may include subband frequency configuration pattern information and subband symbol and slot time configuration pattern information used in implementing semi-static subband full duplex communication. RRC signaling 671 may additionally or alternatively include subband frequency configuration pattern information and subband symbol and slot time configuration pattern information used in preconfiguring UE 115 with a plurality of subband frequency configuration patterns and a plurality of subband symbol and slot time configuration patterns for dynamic subband full duplex operation. Subband full duplex configuration logic 605 of some examples may thus cause UE 115 to receive (e.g., via receiver 618) MAC-CE signaling 672 and/or DCI signaling 673 providing control of UE 115 with respect to selecting and/or activating one or more subband frequency configuration patterns of the plurality of subband frequency configuration patterns and one or more subband symbol and slot time configuration patterns of the plurality of subband symbol and slot time configuration patterns for dynamic subband full duplex communication.

The signaling for subband full duplex communication (e.g., RRC signaling 671, MAC-CE signaling 672, and/or DCI signaling 673) received by UE 115 may, according to some examples, include subband full duplex slot periodicity information for the subband full duplex communication. The signaling configured for subband full duplex communication received by UE 115 may additionally or alternatively include subband full duplex slot offset information for the subband full duplex communication.

After UE 115 has been configured for subband full duplex configuration (e.g., been provided appropriate subband full duplex configuration information via RRC signaling 671, MAC-CE signaling 672, and/or DCI signaling 673), program code of subband full duplex configuration logic 605, when executed by processor 602, may cause UE 115 and/or components thereof to communicate (e.g., via transmitter 616 and/or receiver 618, depending upon full duplex mode or half duplex mode operation) messages 681 (e.g., uplink control and/or user data, payload data, etc.) and/or messages 682 (e.g., downlink control and/or user data, payload data, etc.) via at least one uplink or downlink of a subband full duplex communication session. For example, UE 115 may engage in subband full duplex communication session communications with base station 105 using at least one uplink and/or at least one downlink of a subband full duplex communication configuration in accordance with at least one subband frequency configuration pattern corresponding to the subband frequency configuration pattern information and at least one subband symbol and slot time configuration pattern corresponding to the subband symbol and slot time configuration pattern information. According to some aspects, a first UE 115 may operate in half duplex mode to transmit messages (e.g., messages 681 comprising uplink messages of messages 674, such as may correspond to uplink signal 501 of FIG. 5) to base station 105 operating in full duplex mode (e.g., uplink/downlink MU-MIMO) at the same time as a second UE 115 is operating in half duplex mode to receive messages (e.g., messages 682 comprising downlink messages of messages 674, and as may correspond to downlink signal 502 of FIG. 5) from base station 105. Similarly, UE 115 may operate in half duplex mode (e.g., downlink MU-MIMO) to receive messages (e.g., messages 682 comprising downlink messages of messages 674, such as may correspond to downlink signal 502 of FIG. 5) from base station 105 operating in full duplex mode (e.g., uplink/downlink MU-MIMO) at the same time as another UEs is operating in half duplex mode to transmit messages (e.g., messages 681 comprising uplink messages of messages 674, and as may correspond to uplink signal 501 of FIG. 5) at any particular time.

Transmitter 616 is configured to transmit reference signals, control information and data to one or more other devices, and receiver 618 is configured to receive references signals, synchronization signals, control information and data from one or more other devices. For example, transmitter 616 may transmit signaling, control information and data (e.g., one or more messages of messages 681) to, and receiver 618 may receive signaling and/or control information (e.g., RRC signaling 671, MAC-CE signaling 672, DCI signaling 673, etc.) and data (e.g., one or more messages of messages 682) from, base station 105. In some implementations, transmitter 616 and receiver 618 may be integrated in one or more transceivers. Additionally or alternatively, transmitter 616 or receiver 618 may include or correspond to one or more components of UE 115 described with reference to FIG. 2.

During operation of wireless communications system 600, wireless communications devices of a wireless network are configured for subband full duplex communications, and thus may communicate via one or more uplinks and/or downlinks of a subband full duplex communication session. Subband full duplex configurations provided according to aspects of the disclosure may comprise semi-static subband full duplex configurations in which a subband full duplex configuration is configured and/or implemented semi-statically. For example, a semi-static subband full duplex configuration may be implemented for the duration of a plurality of slots (e.g., time domain sub-portions, such as 10 ms, defined with respect to a subframe of transmission frame, where a transmission frame may comprise a plurality of subframes and a subframe may comprise one or more slots), a plurality of seconds, a plurality of minutes, a plurality of hours, etc. Additionally or alternatively, subband full duplex configurations provided according to aspects of the disclosure may comprise dynamic subband full duplex configurations in which a subband full duplex configuration is configured and/or implemented dynamically. For example, a dynamic subband full duplex configuration may be implemented on a per slot basis, a per symbol (e.g., a complex number representing the amplitude and phase of an M-ary modulation scheme, where a slot may comprise a plurality of symbols) basis, etc. One or more of the foregoing subband full duplex configurations may be implemented with respect to particular situations, communication environments, channel conditions, etc. to provide for subband full duplex for wireless communication configured to mitigate or avoid issues with respect to various forms of interference and clutter.

Figure 7A:
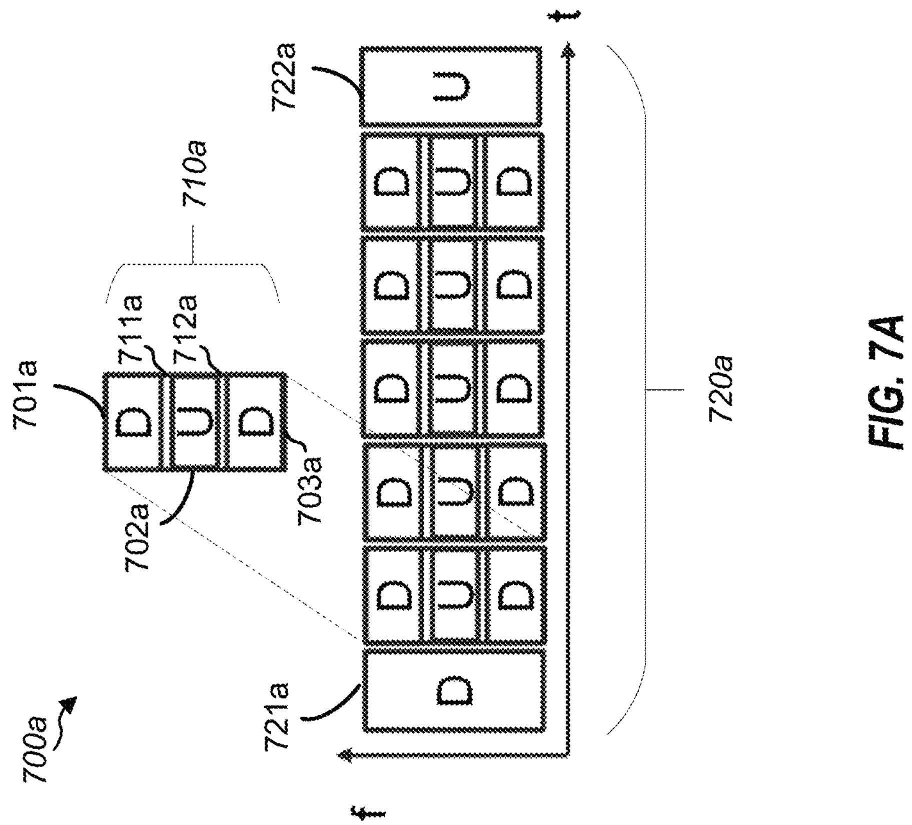
FIGS. 7A and 7B illustrate subband full duplex configurations as may be implemented for wireless communications according to one or more aspects.
Figure 7B:
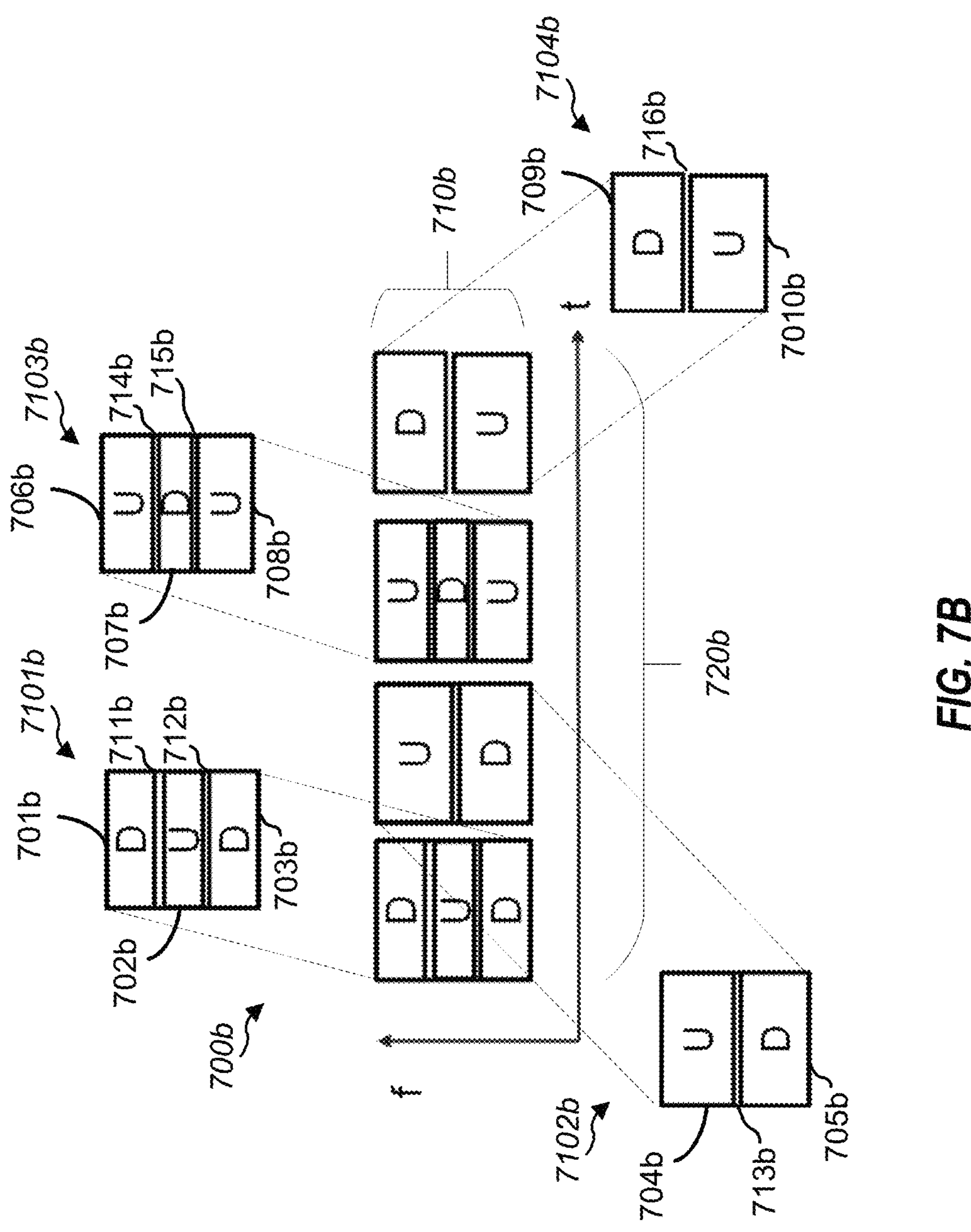

In an example of a semi-static subband full duplex configuration, semi-static configuration of one or more downlink subbands, one or more uplink subbands, and one or more guard bands is provided via RRC signaling 671 (e.g., as may be transmitted under control of subband full duplex configuration logic 661 and/or received under control of subband full duplex configuration logic 605) according to aspects of the present disclosure. FIGS. 7A and 7B illustrate subband full duplex configurations as may be configured and/or implemented semi-statically via RRC signaling.

Referring first to FIG. 7A, subband full duplex configuration 700*a* comprises subband frequency configuration pattern 710*a*. A subband frequency configuration pattern according to aspects of the disclosure may comprise an uplink and downlink frequency domain pattern for subband full duplex symbols and/or slots. For example, subband frequency configuration pattern 710*a* may comprise one or more resource block (RB) sets (e.g., one or more subcarriers in the frequency domain) for one or more downlink subbands (e.g., downlink subbands 701*a* and 703*a*), one or more RB sets for one or more uplink subbands (e.g., uplink subband 702*a*), and one or more RB sets for one or more guard bands (e.g., guard bands 711*a* and 712*a*).

It should be understood that the number of subbands, the relative placement of the subbands within the frequency domain of the available bandwidth, and the bandwidth of each subband and guard band in the example of subband frequency configuration pattern 710*a* is illustrative and does not form or indicate a limitation with respect to implementations according to the concepts herein. Further, in the example of subband frequency configuration pattern 710*a*, downlink subbands 701*a* and 703*a* provide segmented downlink bandwidth (e.g., comprising upper frequency bandwidth of downlink subband 701*a* and lower frequency bandwidth of downlink subband 703*a*). According to some examples, uplink subbands of a subband frequency configuration pattern may additionally or alternatively be segmented. Such downlink and/or uplink segmented bandwidth may be utilized by a same or different wireless communications devices in subband full duplex communications. It should be understood, however, that the bandwidth of downlink and/or uplink subbands need not be segmented, whether utilized by a same or different wireless communications devices, according to aspects of the disclosure.

Subband full duplex configuration 700*a* of FIG. 7A further comprises subband symbol and slot time configuration pattern 720*a*. A subband symbol and slot time configuration pattern according to aspects of the disclosure may comprise time domain pattern for instances of one or more subband frequency configuration patterns within a window of time. For example, a subband symbol and slot time configuration pattern may comprise, for a window of one or more slots (e.g., M number of slots), a per slot pattern for symbols to be configured as subband full duplex symbols in accordance with one or more subband frequency configuration patterns. A time domain pattern of a subband symbol and slot time configuration pattern may contain a single or multiple subband frequency configuration patterns. If containing multiple subband frequency configuration patterns, a subband symbol and slot time configuration pattern may be provided for a total of M slots, with M1 number of slots of subband frequency configuration pattern 1, M2 number of slots of subband frequency configuration pattern 2, etc. Although a subband symbol and slot time configuration pattern may define a subband full duplex configuration which includes symbols of a slot that are not subband full duplex symbols as shown in FIG. 7A (e.g., downlink symbol 721*a* and uplink symbol 722*a* of subband full duplex configuration 700*a*), a subband symbol and slot time configuration pattern of some examples may define a subband full duplex configuration which includes symbols of a slot that are all subband full duplex symbols (e.g., whether of a same or different subband frequency configuration patterns).

RRC signaling may be utilized to provide semi-static configuration and/or implementation of subband full duplex configuration 700*a*. In an example according to subband full duplex configuration 700*a*, RRC signaling 671 includes subband frequency configuration pattern information and subband symbol and slot time configuration pattern information (e.g., as may be stored as subband full duplex configuration information 662 and/or subband full duplex configuration information 606) for configuring one or more wireless communications devices (e.g., UEs 115) for subband full duplex communication.

The subband frequency configuration pattern information of RRC signaling 671 for subband frequency configuration pattern 710*a* may, for example, include information regarding one or more RB sets (e.g., identification of each RB included in a set, RB start and end information, RB indexes, etc.) for downlink subbands and one or more RB sets for uplink subbands of the subband frequency configuration pattern. For example, the subband frequency configuration pattern information of RRC signaling 671 may include information regarding one or more RB sets for downlink subbands 701*a* and 703*a* and one or more RB sets for uplink subband 702*a* of subband frequency configuration pattern 710*a*. The RBs of guard bands 711*a* and 712*a* of subband frequency configuration pattern 710*a* may be implicitly known or determined from the configured downlink and uplink subbands of this example. For example, the subband frequency configuration pattern may comprise at least one guard band disposed between a downlink subband of one or more downlink subbands and an uplink subband of one or more uplink subbands, and RBs of the at least one guard band may comprise RBs between RBs of the RB set information for the one or more downlink subbands and RB s of the RB set information for the one or more uplink subbands.

The subband symbol and slot time configuration pattern information of RRC signaling 671 for subband frequency configuration pattern 710*a* may include information regarding a number of slots and/or symbols for each subband symbol and slot time configuration pattern (e.g., each subband symbol and slot time configuration pattern may comprise a different number of slots and/or symbols), start symbol and end symbol for each subband symbol and slot time configuration pattern (e.g., each subband symbol and slot time configuration pattern may have different start symbol and end symbol configured as subband full duplex symbols), etc. For example, the subband symbol and slot time configuration pattern information may, for a window of M number of slots, and per slot of the M slots, include information regarding the start symbol i and the end symbol j to be configured as subband full duplex symbols (e.g., instances of subband frequency configuration pattern 710*a*) in the slot. According to some aspects, each slot of the M slots may have different or same start symbol and end symbol of the subband full duplex symbols. For a slot having no subband full duplex symbols, the start symbol and end symbol information may be null or set to a predesignated value (e.g., 0) to indicate that there are no subband full duplex symbols in that slot.

RRC signaling 671 of some examples may include information (e.g., as may be stored as subband full duplex configuration information 662 and/or subband full duplex configuration information 606) in addition to subband frequency configuration pattern information and subband symbol and slot time configuration pattern information for subband full duplex configuration 700*a*. For example, RRC signaling 671 may include slot periodicity information for subband full duplex communication. According to some examples in which all symbols of a slot are configured as subband full duplex symbols and/or all slots are configured as subband full duplex symbols, slot periodicity information may be omitted or otherwise null. However, in examples in which slot periodicity information is utilized, slot periodicity information may define a periodicity of repeating a defined slot pattern of M slots. According to some aspects, a pattern of M slots may be repeated Tms (e.g., Tms may comprise exactly M number of slots to repeat the M slots) or a window of subband full duplex slot patterns in which the pattern of M slots will repeat until the window of Tms ends or until a next subband full duplex configuration update. Additionally or alternatively, RRC signaling 671 may include subband full duplex slot offset information for subband full duplex communication. Subband full duplex slot offset information may, for example, define a start offset for the at least one subband frequency configuration pattern. According to some examples, symbols configured for subband full duplex may include a first symbol of the respective slot and corresponding subband full duplex slot offset information may be omitted or otherwise null. However, in examples in which subband full duplex slot offset information is utilized, subband full duplex slot offset information may indicate an offset value to a subband frequency configuration pattern (e.g., K symbols/slots offset from slot 0 of current frame).

Referring now to FIG. 7B, subband full duplex configuration 700*b* comprises subband frequency configuration patterns 710*b*. Similar to subband frequency configuration pattern 710*a* above, subband frequency configuration patterns 710*b* may each comprise one or more RB sets for one or more downlink subbands, one or more RB sets for one or more uplink subbands, and one or more RB sets for one or more guard bands. For example, subband frequency configuration pattern 7101*b* of subband frequency configuration patterns 710*b* may comprise RB sets for downlink subbands 701*b* and 703*b*, an RB set for uplink subband 702*b*, and RB sets for guard bands 711*b* and 712*b*. Likewise, subband frequency configuration pattern 7102*b* of subband frequency configuration patterns 710*b* may comprise an RB set for uplink subband 704*b*, an RB set for downlink subband 705*b*, and an RB set for guard band 713*b*. Similarly, subband frequency configuration pattern 7103*b* of subband frequency configuration patterns 710*b* may comprise RB sets for uplink subbands 706*b* and 708*b*, an RB set for downlink subband 707*b*, and RB sets for guard bands 714*b* and 715*b*. Further, subband frequency configuration pattern 7104*b* of subband frequency configuration patterns 710*b* may comprise an RB set for downlink subband 709*b*, an RB set for uplink subband 7010*b*, and an RB set for guard band 716*b*.

It should be understood that the number of subband frequency configuration patterns, the number of subbands within any particular subband frequency configuration pattern, the relative placement of the subbands within the frequency domain of the available bandwidth, and the bandwidth of each subband and guard band in the example of subband frequency configuration pattern 710*a* is illustrative and does not form or indicate a limitation with respect to implementations according to the concepts herein. Further, in the example of subband frequency configuration patterns 710*b*, various downlink subbands and uplink subbands provide segmented bandwidth (e.g., comprising non contiguous upper frequency bandwidth and lower frequency bandwidth portions). Such downlink and/or uplink segmented bandwidth may be utilized by a same or different wireless communications devices in subband full duplex communications. It should be understood, however, that the bandwidth of downlink and/or uplink subbands need not be segmented, whether utilized by a same or different wireless communications devices, according to aspects of the disclosure.

Similar to subband full duplex configuration 700*a* above, subband full duplex configuration 700*b* of FIG. 7B comprises a subband symbol and slot time configuration pattern. Subband symbol and slot time configuration pattern 720*b* of subband full duplex configuration 700*b* may comprise time domain pattern for instances of subband frequency configuration patterns within a window of time. For example, subband symbol and slot time configuration pattern 720*b* may comprise a per slot pattern for symbols to be configured as subband full duplex symbols in accordance with one or more subband frequency configuration patterns for a window of one or more slots (e.g., M number of slots), as described in the example above. Although subband symbol and slot time configuration pattern 720*b* of the illustrated example may define a subband full duplex configuration which includes symbols of a slot that are all subband full duplex symbols, a subband symbol and slot time configuration pattern may define a subband full duplex configuration which includes symbols of a slot that are not subband full duplex symbols (e.g., downlink symbol 721*a* and uplink symbol 722*a* of FIG. 7A).

RRC signaling may be utilized to provide semi-static configuration and/or implementation of subband full duplex configuration 700*b*. In an example according to subband full duplex configuration 700*b*, RRC signaling 671 includes subband frequency configuration pattern information and subband symbol and slot time configuration pattern information (e.g., as may be stored as subband full duplex configuration information 662 and/or subband full duplex configuration information 606) for configuring one or more wireless communications devices (e.g., UEs 115) for subband full duplex communication.

According to some examples, the subband frequency configuration pattern information of RRC signaling 671 for subband frequency configuration patterns 710*b* may include information regarding one or more uplink/downlink patterns and start and end information for one or more guard bands. The subband frequency configuration pattern information of RRC signaling 671 for subband frequency configuration pattern 710*b* may, for example, include information regarding a downlink and uplink pattern indicating alternate instances of downlink and uplink subbands for one or more downlink subbands and one or more uplink subbands of the subband full duplex communication (e.g., U, 0, etc. and D, 1, etc. indications for particular uplink/downlink patterns). For example, subband frequency configuration pattern information for subband frequency configuration patterns 710*b* may include uplink/downlink patterns for each of a plurality of subband frequency patterns (e.g., D/U/D, U/D, U/D/U, and D/U, 1/0/1, 0/1, 0/1/0, and 1/0, etc. corresponding to subband frequency configuration patterns 7101*b*, 7102*b*, 7103*b*, and 7104*b*, respectively). Start and end information for one or more guard bands for subband frequency configuration patterns 710*b* may include RB start and end information (e.g., RB indexes, such as start RB i and end RB j) of each guard band. There may be one or more guard bands for each subband frequency configuration pattern, such as depending upon the subband frequency configuration pattern or patterns of the subband full duplex configuration. Each guard band may have a same or different number of RBs. For example, for the uplink/downlink patterns D/U/D or U/D/U, there may be two guard bands for the uplink/downlink pattern (e.g., a guard band between each downlink and uplink subband). In another example, for the uplink/downlink patterns D/U/D or U/D/U, there may be four guard bands for the uplink/downlink pattern (e.g., a guard band between each downlink and uplink subband and guard bands on the edge of the BWP or CC to provide edge guard bands, such as where the BWP or CC is adjacent or near a frequency of another carrier in use). A subband frequency configuration pattern may comprise one or more RB sets for one or more downlink subbands of the downlink and uplink pattern starting or ending adjacent to a RB of a respective guard band defined by the RB start and end information for the one or more guard bands and one or more RB sets for one or more uplink subbands of the downlink and uplink pattern starting or ending adjacent to a RB of a respective guard band defined by the RB start and end information for the one or more guard bands. The RBs of the downlink subbands and uplink subbands may be implicitly known or determined from the configured guard bands, and the edges of the BWP or CC, of this example. For example, RB sets for downlink subbands 701*b* and 703*b* and uplink subband 702*b* may be determined from the RB start and end information for guard bands 711*b* and 712*b* and the BWP or CC edges, RB set for uplink subband 704*b* and RB set for downlink subband 705*b* may be determined from the RB start and end information for guard band 713*b* and the BWP or CC edges, RB sets for uplink subbands 706*b* and 708*b* and RB set for downlink subband 707*b* may be determined from the RB start and end information for guard bands 714*b* and 715*b* and the BWP or CC edges, and RB set for downlink subband 709*b* and RB set for uplink subband 7010*b* may be determined from the RB start and end information for guard band 716*b* and the BWP or CC edges.

According to further examples, the subband frequency configuration pattern information of RRC signaling 671 for subband frequency configuration patterns 710*b* may include start and end information for one or more guard bands and information indicating one or more uplink or downlink subbands for one or more uplink/downlink patterns. Start and end information for one or more guard bands for subband frequency configuration patterns 710*b* may include RB start and end information (e.g., RB indexes, such as start RB i and end RB j) of each guard band. As described above, there may be 1 or more guard bands for each subband frequency configuration pattern (e.g., depending upon the subband frequency configuration pattern or patterns of the subband full duplex configuration), and each guard band may have a same or different number of RBs. A subband frequency configuration pattern may comprise one or more RB sets for one or more downlink subbands of the subband full duplex communication starting or ending adjacent to a RB of a respective guard band defined by RB start and end information for the one or more guard bands and one or more RB sets for one or more uplink subbands of the subband full duplex communication starting or ending adjacent to a RB of a respective guard band defined by the RB start and end information for one or more guard bands. Information indicating an uplink or downlink subband for subband frequency configuration patterns 710*b* may include a designation of uplink (e.g., "U", "0", etc.) or a designation of downlink (e.g., "D", "1", etc.) for a reference subband (e.g., a lowest frequency subband, a highest frequency subband, etc.) of a respective subband frequency configuration pattern. For example, a designator (e.g., "D", "1", etc.) provided with respect to the lowest frequency subband for subband frequency configuration pattern 7101*b* may indicate a downlink subband, whereas a designator (e.g., "U", "0", etc.) provided with respect to the lowest frequency subband for subband frequency configuration pattern 7103*b* may indicate an uplink subband. Designations for other subbands of a subband frequency configuration pattern may be implicitly known or determined from the indicated subband (e.g., the designation changes from uplink to downlink or from downlink to uplink at each instance of a guard band within the subband frequency configuration pattern). The RBs of the downlink subbands and uplink subbands may be implicitly known or determined from the configured guard bands of this example (e.g., RB sets for downlink subbands 701*b* and 703*b* and uplink subband 702*b* determined from the RB start and end information for guard bands 711*b* and 712*b*, RB set for uplink subband 704*b* and RB set for downlink subband 705*b* determined from the RB start and end information for guard band 713*b*, RB sets for uplink subbands 706*b* and 708*b* and RB set for downlink subband 707*b* determined from the RB start and end information for guard bands 714*b* and 715*b*, and RB set for downlink subband 709*b* and RB set for uplink subband 7010*b* determined from the RB start and end information for guard band 716*b*).

According to still further examples, the subband frequency configuration pattern information of RRC signaling 671 for subband frequency configuration patterns 710*b* may include information providing per uplink subband indications. For example, indications per uplink subband may include start and end information and/or allocation bandwidth for one or more uplink subbands of a subband frequency configuration pattern. Start and end information for one or more uplink subbands for subband frequency configuration patterns 710*b* may include RB start and end information (e.g., RB indexes, such as start RB i and end RB j) of each guard band. As described above, subband frequency configuration patterns according to aspects of the disclosure include alternate instances of downlink and uplink subbands and there may be 1 or more guard bands for each subband frequency configuration pattern (e.g., depending upon the subband frequency configuration pattern or patterns of the subband full duplex configuration). The RBs of the downlink subbands and/or guard bands may be implicitly known or determined from the configured uplink subbands of this example. For example, one or more guard band bandwidth may be pre-configured or otherwise known. RBs of an allocated BWP or CC that are adjacent to uplink subbands of the uplink subband indication information may be known or determined as one or more guard bands (e.g., RBs providing a predetermined bandwidth for a guard band and that are adjacent to a configured uplink subband are designated as guard bands). RBs of an allocated BWP or CC not included in the uplink subbands of the uplink subband indication information and/or not determined as one or more guard bands may be determined to be RBs of one or more downlink subbands. As an example, RB sets for downlink subbands 701*b* and 703*b* and RB sets for guard bands 711*b* and 712*b* determined from the RB start and end information for uplink subband 702*b*, RB set for downlink subband 705*b* and RB set for guard band 713*b* determined from the RB start and end information for uplink subband 704*b*, RB set for downlink subband 707*b* and RB sets for guard bands 714*b* and 715*b* determined from the RB start and end information for uplink subbands 706*b* and 708*b*, and RB set for downlink subband 709*b* and RB set for guard band 716*b* determined from the RB start and end information for uplink subband 7010*b*.

The foregoing examples of subband frequency configuration pattern information in which aspects of uplink and/or downlink subbands may be implicitly known or determined may provide efficiencies (e.g., reduced data transmission, lower bandwidth utilization for RRC signaling, etc.) in implementation in which multiple subband frequency configuration patterns are provided in a subband full duplex configuration, as compared to subband frequency configuration pattern information comprising information regarding one or more RB sets for downlink subbands and one or more RB sets for uplink subbands of the subband frequency configuration patterns. Nevertheless, implementations in which multiple subband frequency configuration patterns are provided in a subband full duplex configuration may utilize subband frequency configuration pattern information comprising information regarding one or more RB sets for downlink subbands and one or more RB sets for uplink subbands of the subband frequency configuration patterns according to some examples, such as where a RB set for an uplink and/or downlink subband includes non-contiguous RBs.

The subband symbol and slot time configuration pattern information of RRC signaling 671 for subband frequency configuration patterns 710*b* may include information regarding a number of slots and/or symbols for each subband symbol and slot time configuration pattern, start symbol and end symbol for each subband symbol and slot time configuration pattern, etc., as described above. For example, the subband symbol and slot time configuration pattern information may, for a window of M number of slots, and per slot of the M slots, include information regarding the start symbol i and the end symbol j to be configured as subband full duplex symbols (e.g., instances of subband frequency configuration pattern 710*a*) in the slot. In the example of subband frequency configuration patterns 710*b*, comprising multiple subband frequency configuration patterns (e.g., subband frequency configuration patterns 7101*b*, 7102*b*, 7103*b*, and 7104*b*) subband symbol and slot time configuration pattern 720*b* may be provided for a total of M number of slots, with M1 number of slots of subband frequency configuration pattern 7101*b*, M2 number of slots of subband frequency configuration pattern 7102*b*, M3 slots of subband frequency configuration pattern 7103*b*, and M4 slots of subband frequency configuration pattern 7104*b*. According to some aspects, each slot of the M slots may have different or same start symbol and end symbol of the subband full duplex symbols. For a slot having no subband full duplex symbols, the start symbol and end symbol information may be null or set to a predesignated value (e.g., 0) to indicate that there are no subband full duplex symbols in that slot.

RRC signaling 671 of some examples of semi-static subband full duplex configuration may include information (e.g., as may be stored as subband full duplex configuration information 662 and/or subband full duplex configuration information 606) in addition to subband frequency configuration pattern information and subband symbol and slot time configuration pattern information for subband full duplex configuration 700*b*. For example, RRC signaling 671 may include slot periodicity information for subband full duplex communication, as described above with respect to a previous example. Additionally or alternatively, RRC signaling 671 may include subband full duplex slot offset information for subband full duplex communication, as described above with respect to a previous example.

Semi-static subband full duplex configuration, such as according to the above examples referencing FIGS. 7A and 7B, may be cell-common (e.g., applicable to all UEs served by a cell) or UE dedicated (e.g., applicable to a particular UE). According to aspects of the disclosure, one or more indications may be provided regarding whether a subband full duplex configuration and/or subband frequency configuration pattern information and subband symbol and slot time configuration pattern information therefore is/are cell-common or UE dedicated (e.g., the RRC signaling may include one or more indication in or in association with the subband frequency configuration pattern information and subband symbol and slot time configuration pattern information). In a case in which a subband full duplex configuration is UE dedicated, information to indicate whether a subband full duplex configuration is per BWP or CC, or is a common configuration across all BWPs or CCs.

In an example of a dynamic subband full duplex configuration, preconfiguring or partial preconfiguring of one or more downlink subbands, one or more uplink subbands, and one or more guard bands is provided. For example, subband full duplex configurations, such as those illustrated in FIGS. 7A and 7B, may be implemented as dynamic subband full duplex configurations in which preconfiguring or partial preconfiguring is utilized according to aspects of the present disclosure. According to aspects of the disclosure, subband frequency configuration patterns and subband symbol and slot time configuration patterns may be preconfigured, partially or wholly, via RRC signaling 671 (e.g., as may be transmitted under control of subband full duplex configuration logic 661 and/or received under control of subband full duplex configuration logic 605). Thereafter, one or more subband frequency configuration patterns and one or more subband symbol and slot time configuration patterns may be selected and/or activated via MAC-CE signaling 672 and/or DCI signaling 673 (e.g., either or both of which may be transmitted under control of subband full duplex configuration logic 661 and/or received under control of subband full duplex configuration logic 605).

In configuring subband frequency configuration patterns according to aspects, multiple subband frequency configuration patterns (e.g., a first number, T1, of subband frequency configuration patterns) may be preconfigured via RRC signaling 671. For example, each subband frequency configuration pattern may be defined or otherwise configured using RRC signaling as described with respect to the examples above (e.g., RRC signaling including information regarding one or more RB sets for downlink subbands and one or more RB sets for uplink subbands of a subband frequency configuration pattern, RRC signaling including information regarding one or more uplink/downlink patterns and start and end information for one or more guard bands, RRC signaling including start and end information for one or more guard bands and information indicating an uplink or downlink subband for one or more uplink/downlink patterns, and/or RRC signaling including information providing per uplink subband indications). Irrespective of the particular technique used in preconfiguring the subband frequency configuration patterns, the subband frequency configuration patterns may have different downlink and uplink subband configurations. For example, as shown in database 810 of FIG. 8A (e.g., as may be stored as subband full duplex configuration information 662 and/or subband full duplex configuration information 606), subband frequency configuration pattern information 812 may include information for subband frequency configuration patterns 710*a*, 7101*b*, 7102*b*, 7103*b*, 7104*b*, etc. Indices 811 of database 810 may be provided for use in identifying or otherwise designating one or more subband frequency configuration patterns, such as for their selection and/or activation as a dynamic subband full duplex configuration.

In configuring subband symbol and slot time configuration patterns according to aspects, multiple subband symbol and slot time configuration patterns (e.g., a second number, T2, of subband symbol and slot time configuration patterns) may be preconfigured via RRC signaling 671. For example, each subband symbol and slot time configuration pattern may be defined or otherwise configured using RRC signaling as described with respect to the examples above (e.g., RRC signaling including information regarding a number of slots and/or symbols for each subband symbol and slot time configuration pattern, start symbol and end symbol for each subband symbol and slot time configuration pattern, etc.). Irrespective of the particular technique used in preconfiguring the subband symbol and slot time configuration patterns, the subband symbol and slot time configuration patterns may have different time domain patterns for instances of one or more subband frequency configuration patterns. For example, as shown in database 820 of FIG. 8B (e.g., as may be stored as subband full duplex configuration information 662 and/or subband full duplex configuration information 606), subband symbol and slot time configuration pattern information 822 may include information for subband symbol and slot time configuration patterns 720*a*, 720*b*, etc. Indices 821 of database 820 may be provided for use in identifying or otherwise designating one or more subband symbol and slot time configuration patterns, such as for their selection and/or activation as a dynamic subband full duplex configuration. As described above, a time domain pattern of a subband symbol and slot time configuration pattern may contain a single or multiple subband frequency configuration patterns. If containing multiple subband frequency configuration patterns, a subband symbol and slot time configuration pattern may be provided for a total of M number of slots, with M1 number of slots of subband frequency configuration pattern 1, M2 number of slots of subband frequency configuration pattern 2, etc.

RRC signaling 671 of some examples of dynamic subband full duplex configuration may include information (e.g., as may be stored as subband full duplex configuration information 662 and/or subband full duplex configuration information 606) in addition to subband frequency configuration pattern information and subband symbol and slot time configuration pattern information. For example, RRC signaling 671 may include information regarding multiple slot periodicity options (e.g., a third number, T3, of slot periodicity options) for subband full duplex communication, similar to the slot periodicity information described with respect to semi-static subband full duplex configuration examples above.

According to some examples of dynamic subband full duplex configuration, MAC-CE signaling may be utilized to select and/or activate on or more subband full duplex configuration. For example, MAC-CE signaling 672 may include index information (e.g., subband frequency configuration pattern index i among the T1 preconfigured subband frequency configuration patterns) corresponding to one or more subband frequency configuration patterns of database 810 and index information (e.g., subband symbol and slot time configuration pattern index j among the T2 preconfigured subband symbol and slot time configuration patterns) corresponding to one or more subband symbol and slot time configuration patterns of database 820 for selection and/or activation as a dynamic subband full duplex configuration.

MAC-CE signaling 672 of some examples of dynamic subband full duplex configuration may include information (e.g., as may be stored as subband full duplex configuration information 662 and/or subband full duplex configuration information 606) in addition to information corresponding to subband frequency configuration pattern information and information corresponding to subband symbol and slot time configuration pattern information. For example, MAC-CE signaling 672 may include information corresponding to slot periodicity options for subband full duplex communication. MAC-CE signaling 672 may include index information (e.g., slot periodicity option index k among the T3 preconfigured slot periodicity options) corresponding to one or more slot periodicity options for use with respect to a dynamic subband full duplex configuration. Additionally or alternatively, MAC-CE signaling 672 may include subband full duplex slot offset information for subband full duplex communication. The subband full duplex slot offset information included in the MAC-CE signaling according to some examples may define a slot offset of a fourth number, T4, of slots or symbols after the MAC-CE signaling is received or after an acknowledgement (ACK) of the MAC-CE signaling is received. For example, subband full duplex slot offset information provided via MAC-CE signaling 672 may comprise one or more offset values to start subband full duplex configurations and/or one or more subband frequency configuration patterns thereof (e.g., K slots/symbols after receiving the MAC-CE signaling, after receiving the ACK of the MAC-CE signaling, etc.).

In operation according to some examples, a subband full duplex configuration selected and/or activated via MAC-CE signaling may continue and repeat with the M slots of a corresponding subband symbol and slot time configuration pattern. The subband frequency pattern of some examples may continue and repeat with one or more slots defined by the subband frequency pattern until subsequent MAC-CE signaling is transmitted for deactivating the subband frequency pattern. The subband full duplex configuration selected and/or activated via MAC-CE signaling may fall back to a slot format implemented prior to receiving the subband full duplex configuration selected and/or activated via MAC-CE signaling or until receiving MAC-CE signaling for deactivation of the subband full duplex configuration selected and/or activated via MAC-CE signaling.

According to further examples of dynamic subband full duplex configuration, DCI signaling may be utilized to select and/or activate on or more subband full duplex configuration. DCI signaling utilized according to some examples may comprise a DCI format created for use with respect to dynamic full duplex configuration. Some examples may reuse a preexisting DCI format of a wireless network protocol (e.g., 5G NR network protocols), with or without assignment, for dynamic full duplex configuration. Further examples may reuse DCI format 2_0 of a slot format indicator (SFI) configuration (e.g., new two fields to indicate subband frequency configuration pattern index i, and subband symbol and slot time configuration pattern index j may be provided in SFI in group common DCI format 2_0), or may use a SFI configuration created for use with respect to dynamic full duplex configuration. Irrespective of the particular DCI format utilized, DCI signaling 673 may include index information (e.g., subband frequency configuration pattern index i among the T1 preconfigured subband frequency configuration patterns) corresponding to one or more subband frequency configuration patterns of database 810 and index information (e.g., subband symbol and slot time configuration pattern index j among the T2 preconfigured subband symbol and slot time configuration patterns) corresponding to one or more subband symbol and slot time configuration patterns of database 820 for selection and/or activation as a dynamic subband full duplex configuration.

DCI signaling 673 of some examples of dynamic subband full duplex configuration may include information (e.g., as may be stored as subband full duplex configuration information 662 and/or subband full duplex configuration information 606) in addition to information corresponding to subband frequency configuration pattern information and information corresponding to subband symbol and slot time configuration pattern information. For example, DCI signaling 673 may include information corresponding to slot periodicity options for subband full duplex communication. DCI signaling 673 may include index information (e.g., slot periodicity option index k among the T3 preconfigured slot periodicity options) corresponding to one or more slot periodicity options for use with respect to a dynamic subband full duplex configuration. Additionally or alternatively, DCI signaling 673 may include subband full duplex slot offset information for subband full duplex communication. The subband full duplex slot offset information included in the DCI signaling according to some examples may define a slot offset of a fourth number of slots or symbols after the DCI signaling is received or after an ACK of the DCI signaling is received. For example, subband full duplex slot offset information provided via DCI signaling 673 may comprise one or more offset values to start subband full duplex configurations and/or one or more subband frequency configuration patterns thereof (e.g., K slots/symbols after receiving the DCI signaling, after receiving the ACK of the DCI signaling, etc.).

In operation according to some examples, a subband full duplex configuration selected and/or activated via DCI signaling may, after the M slots of a corresponding subband symbol and slot time configuration pattern, fall back to a slot format implemented prior to the subband full duplex configuration selected and/or activated via DCI signaling. In accordance with some examples, no repeating of a dynamic subband full duplex configuration selected and/or activated via DCI signaling is performed, unless being again selected and/or activated via DCI signaling.

Dynamic subband full duplex configuration, such as according to the above examples, may be cell-common or UE dedicated. According to aspects of the disclosure, one or more indications may be provided regarding whether a subband full duplex configuration and/or subband frequency configuration pattern information and subband symbol and slot time configuration pattern information therefore is/are cell-common or UE dedicated (e.g., the RRC, MAC-CE, and/or DCI signaling may include one or more indication in or in association with the subband frequency configuration pattern information and subband symbol and slot time configuration pattern information). In a case in which a subband full duplex configuration is UE dedicated, information to indicate whether a subband full duplex configuration is per BWP or CC, or is a common configuration across all BWPs or CCs.

Figure 9:
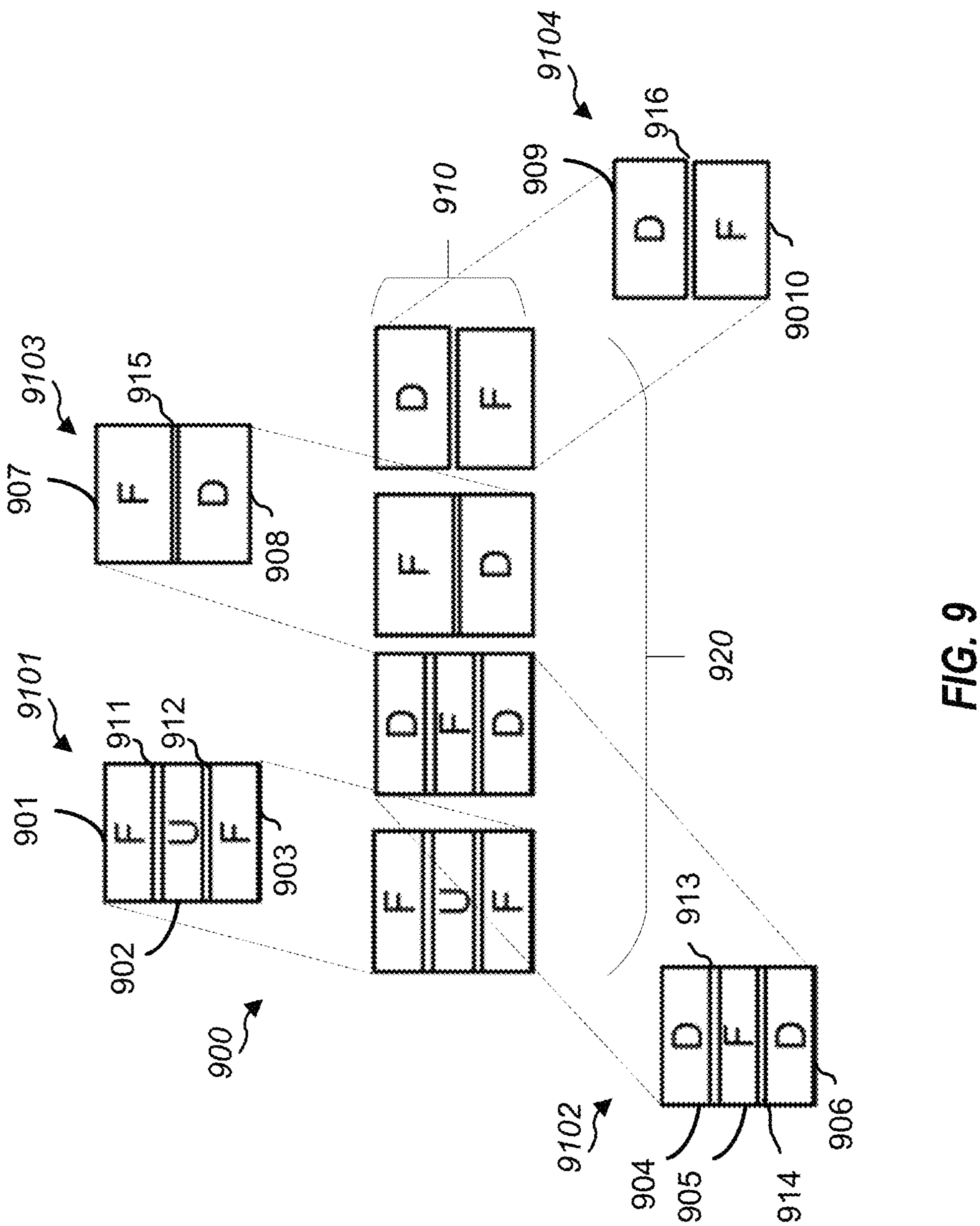
FIG. 9 illustrates subband full duplex configurations as may be implemented for wireless communications according to one or more aspects.

Although the foregoing examples have been described with reference to subband full duplex configurations comprising uplink and downlink subbands, it should be understood that frequency subband patterns configured and/or implemented in accordance with concepts of the present disclosure may comprise subbands designated as other than uplink and/or downlink subbands. Referring FIG. 9, subband full duplex configuration 700 of an example is shown comprising subband frequency configuration patterns 910 provided according to subband symbol and slot time configuration pattern 920. Similar to subband frequency configuration patterns 710*a* and 710*b* above, subband frequency configuration patterns 910 may each comprise one or more RB sets for one or more downlink subbands, one or more RB sets for one or more uplink subbands, and one or more RB sets for one or more guard bands. Further, as shown in FIG. 9, subband frequency configuration patterns 910 may each comprise one or more RB sets for one or more flexible subbands (e.g., available for use for either uplink or downlink as needed). For example, subband frequency configuration pattern 9101 of subband frequency configuration patterns 910 may comprise RB sets for flexible subbands 901 and 903, an RB set for uplink subband 902, and RB sets for guard bands 911 and 912. Likewise, subband frequency configuration pattern 9102 of subband frequency configuration patterns 910 may comprise RB sets for downlink subbands 904 and 906, an RB set for flexible subband 905, and RB sets for guard bands 913 and 914. Similarly, subband frequency configuration pattern 9103 of subband frequency configuration patterns 910 may comprise an RB set for flexible subband 907, an RB set for downlink subband 908, and an RB set for guard band 915. Further, subband frequency configuration pattern 9104 of subband frequency configuration patterns 910 may comprise an RB set for downlink subband 909, an RB set for flexible subband 9010, and an RB set for guard band 916.

Figure 10:
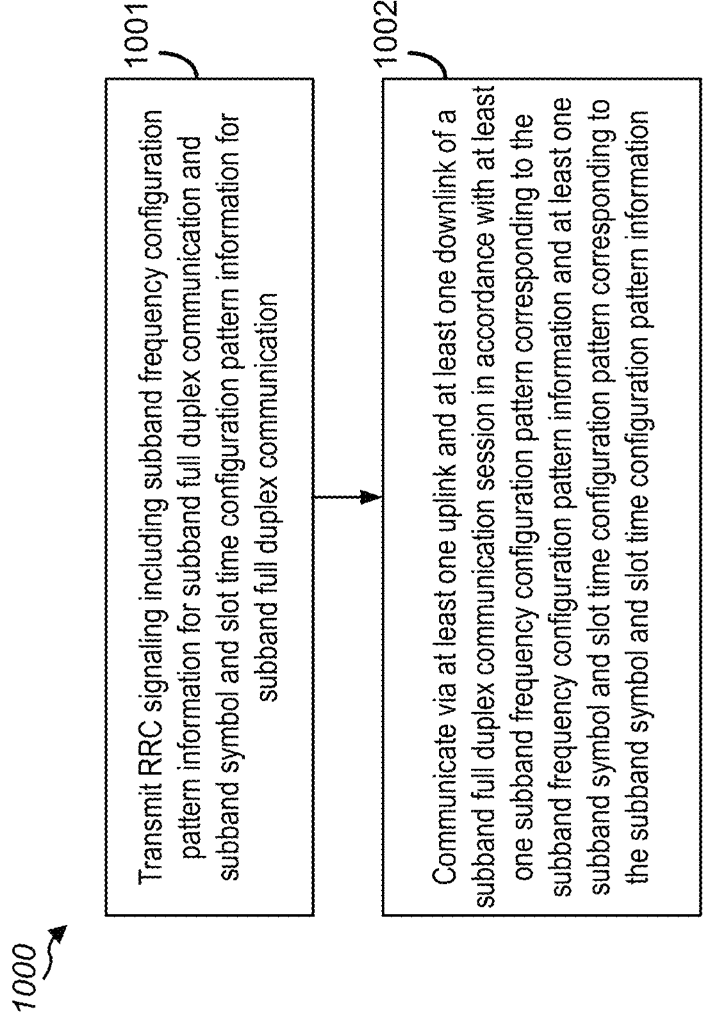
FIG. 10 is a flow diagram illustrating an example process that supports subband full duplex configuration according to one or more aspects.

FIG. 10 is a flow diagram illustrating an example process 1000 that supports subband full duplex configuration (e.g., semi-static and/or dynamic configuration of one or more downlink subbands, one or more uplink subbands, and one or more guard bands) for wireless communication according to one or more aspects. Operations of process 1000 may be performed by a network element, such as base station 105 described above with reference to FIGS. 1-3 and 6 and as described below with reference to FIG. 10. For example, example operations (also referred to as "blocks") of process 1000 may enable base station 105 to support subband full duplex configuration for wireless communication in accordance with concepts of the present disclosure.

At block 1001, the network element transmits RRC signaling including subband frequency configuration pattern information for subband full duplex communication and subband symbol and slot time configuration pattern information for subband full duplex communication. For example, RRC signaling 671 (e.g., as may be transmitted under control of subband full duplex configuration logic 661) including subband frequency configuration pattern information and subband symbol and slot time configuration pattern information (e.g., as may have been stored at base station 105 as subband full duplex configuration information 662) may be transmitted by base station 105 to one or more wireless communications devices (e.g., one or more UEs 115).

In accordance with some examples, the RRC signaling transmitted by the network element may include information in addition to the subband frequency configuration pattern information and subband symbol and slot time configuration pattern information. For example, the RRC signaling may include slot periodicity information, information regarding multiple slot periodicity options, subband full duplex slot offset information, etc.

In some implementations, the RRC signaling may be transmitted by the network element to facilitate semi-static subband full duplex configuration of one or more wireless communications devices. The subband frequency configuration pattern information and subband symbol and slot time configuration pattern information may comprise information facilitating semi-static configuration of one or more downlink subbands, one or more uplink subbands, and one or more guard bands as may be semi-statically implemented by the one or more wireless communications devices for wireless communication with the network element.

In some implementations, RRC signaling may be transmitted by the network element to facilitate dynamic subband full duplex configuration of one or more wireless communications devices. The subband frequency configuration pattern information and subband symbol and slot time configuration pattern information may comprise information facilitating preconfiguring or partial preconfiguring of one or more downlink subbands, one or more uplink subbands, and one or more guard bands as may be dynamically implemented by the one or more wireless communications devices for wireless communication with the network element. In accordance with some examples, RRC signaling 671 includes information regarding a first number (e.g., T1) of subband frequency configuration patterns and a second number (e.g., T2) subband symbol and slot time configuration patterns. One or more subband full duplex configurations implementing selected ones of the preconfigured downlink subbands, uplink subbands, and/or guard bands may be dynamically selected and/or activated via transmitting signaling (e.g., MAC-CE signaling 672 and/or DCI signaling 673) by the network element. For example, the network element may transmit MAC-CE signaling including subband frequency configuration pattern activation information for a UE activating the subband frequency pattern in accordance with at least one subband frequency pattern of the first number, T1, of subband frequency configuration patterns and subband symbol and slot time configuration pattern activation information for the UE activating a subband symbol and slot time configuration pattern of the second number, T2, of subband symbol and slot time configuration patterns. Additionally or alternatively, the network element may transmit DCI signaling including subband frequency configuration pattern selection information for a UE selecting a subband frequency pattern in accordance with at least one subband frequency pattern of the first number, T1, subband frequency configuration patterns and subband symbol and slot time configuration pattern selection information for the UE selecting a subband symbol and slot time configuration pattern of the second number, T2, of subband symbol and slot time configuration patterns. The foregoing MAC-CE and/or DCI signaling may further include information for the UE selecting a periodicity for subband full duplex communication.

At block 1002, the network element communicates via at least one uplink and at least one downlink of a subband full duplex communication session in accordance with at least one subband frequency configuration pattern corresponding to the subband frequency configuration pattern information and at least one subband symbol and slot time configuration pattern corresponding to the subband symbol and slot time configuration pattern information. For example, base station 105 may operate in a full duplex mode in accordance with the subband full duplex configuration to establish and/or maintain a subband full duplex communication session for communicating with one or more wireless communications devices (e.g., UEs 115) via uplinks and downlinks of the subband full duplex communication session. Wireless communications devices correspondingly operating in accordance with the subband full duplex configuration to communicate with the network element via at least one uplink or downlink of the subband full duplex communication session may operate in a full duplex mode or a half duplex mode. For example, a first UE 115 may operate in a half duplex mode in accordance with the subband full duplex configuration to communicate with the network element via an uplink or a downlink of the subband full duplex communication session.

Figure 11:
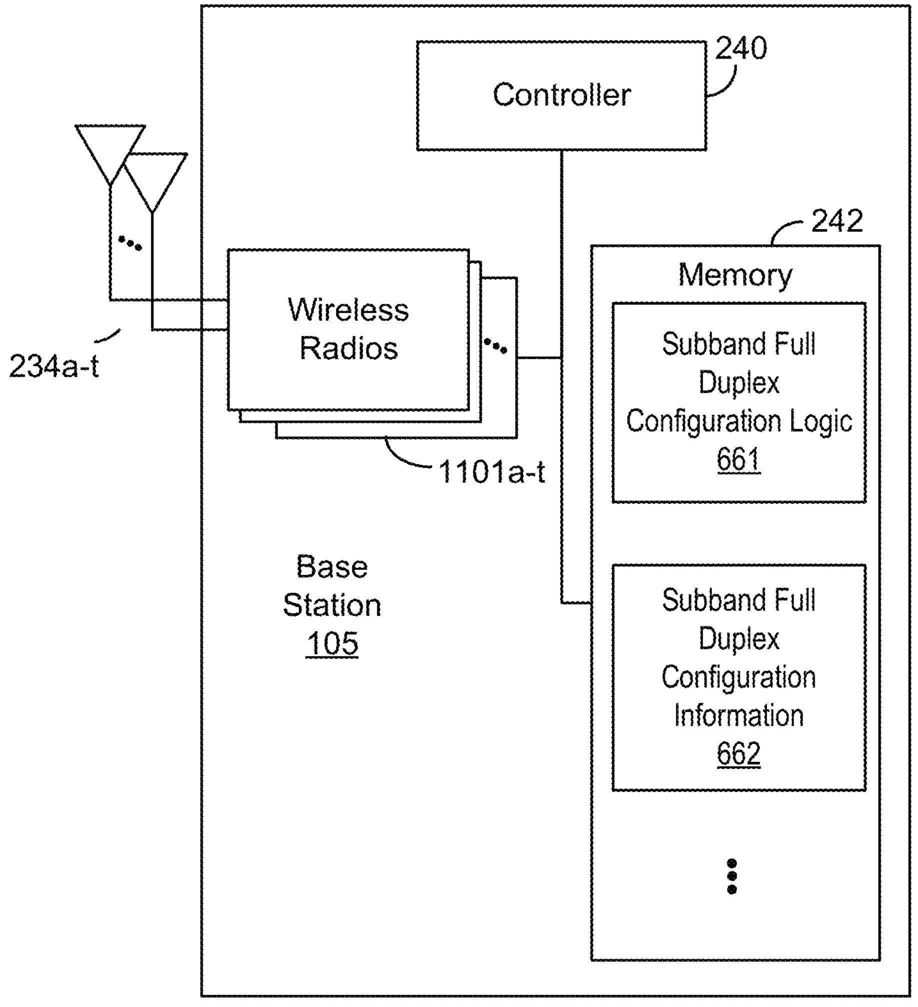
FIG. 11 is a block diagram of an example base station that supports subband full duplex configuration according to one or more aspects.

FIG. 11 is a block diagram of an example base station 105, such as may correspond to any of base stations 105 of FIGS. 1-3, 5, and 6, that supports subband full duplex configuration (e.g., semi-static and/or dynamic configuration of one or more downlink subbands, one or more uplink subbands, and one or more guard bands) for wireless communication according to one or more aspects. Base station 105 may be configured to perform operations, including the blocks of process 900 described with reference to FIG. 9. In some implementations, base station 105 includes the structure, hardware, and components shown and described with reference to base station 105 of FIGS. 1-3, 5, and 6. For example, base station 105 may include controller 240, which operates to execute logic or computer instructions stored in memory 242, as well as controlling the components of base station 105 that provide the features and functionality of base station 105. Base station 105, under control of controller 240, transmits and receives signals via wireless radios 1101*a-t* and antennas 234*a-t*. Wireless radios 1101*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, the memory 242 may include subband full duplex configuration logic 661 and subband full duplex configuration information 662. Subband full duplex configuration logic 661 may be configured to control base station 105 and/or components thereof to perform functions of subband full duplex configuration and wireless communications, such as those described above with reference to FIGS. 6 and 10. Subband full duplex configuration information 662 may be configured to store various data, parameters, etc., such as subband frequency configuration pattern information, subband symbol and slot information, include slot periodicity information, information regarding multiple slot periodicity options, subband full duplex slot offset information, etc., utilized with respect to subband full duplex configuration and/or subband full duplex communications. Base station 105 may receive signals from and/or transmit signals to one or more UEs, such as UE 115 of FIGS. 1-3, 5, 6, and 13.

Figure 12:
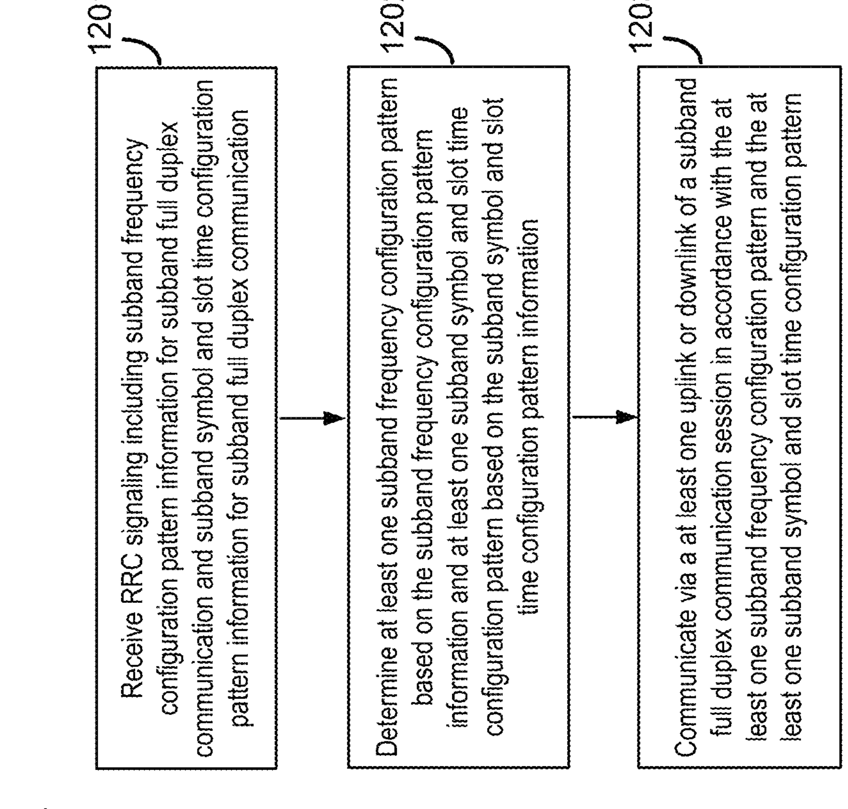
FIG. 12 is a flow diagram illustrating an example process that supports subband full duplex configuration according to one or more aspects.

FIG. 12 is a flow diagram illustrating an example process 1200 that supports subband full duplex configuration (e.g., semi-static and/or dynamic configuration of one or more downlink subbands, one or more uplink subbands, and one or more guard bands) for wireless communication according to one or more aspects. Operations of process 1200 may be performed by a UE, such as UE 115 described above with reference to FIGS. 1-3 and 6 and as described below with reference to FIG. 12. For example, example operations of process 1200 may enable UE 115 to support subband full duplex configuration for wireless communication in accordance with concepts of the present disclosure.

At block 1201, the UE receives RRC signaling including subband frequency configuration pattern information for subband full duplex communication and subband symbol and slot time configuration pattern information for subband full duplex communication. For example, RRC signaling 671 (e.g., as may be received under control of subband full duplex configuration logic 605) including subband frequency configuration pattern information and slot time configuration pattern information (e.g., as may ultimately be stored at UE 115 as subband full duplex configuration information 606) may be received by UE 115 from a wireless communications device (e.g., base station 105).

In accordance with some examples, the RRC signaling received by the UE may include information in addition to the subband frequency configuration pattern information and subband symbol and slot time configuration pattern information. For example, the RRC signaling may include slot periodicity information, information regarding multiple slot periodicity options, subband full duplex slot offset information, etc.

In some implementations, the RRC signaling may be received by the UE to facilitate semi-statically configuring the UE for subband full duplex communications. The subband frequency configuration pattern information and subband symbol and slot time configuration pattern information may comprise information facilitating semi-static configuration of one or more downlink subbands, one or more uplink subbands, and one or more guard bands as may be semi-statically implemented by the UE for wireless communication with one or more wireless communications devices (e.g., a network element).

In some implementations, RRC signaling may be received by the UE to facilitate dynamically configuring the UE for subband full duplex communications. The subband frequency configuration pattern information and subband symbol and slot time configuration pattern information may comprise information facilitating preconfiguring or partial preconfiguring of one or more downlink subbands, one or more uplink subbands, and one or more guard bands as may be dynamically implemented by the UE for wireless communication with one or more wireless communications devices. One or more subband full duplex configuration implementing selected ones of the preconfigured downlink subbands, uplink subbands, and/or guard bands may be dynamically selected and/or activated via receiving signaling (e.g., MAC-CE signaling 672 and/or DCI signaling 673) by the UE.

At block 1202, the UE determines at least one subband frequency configuration pattern based on the subband frequency configuration pattern information and at least one subband symbol and slot time configuration pattern based on the subband symbol and slot time configuration pattern information. For example, subband full duplex configuration logic 605 may utilize subband frequency configuration pattern information and the subband symbol and slot time configuration pattern information (e.g., as received via RRC signaling 671 and/or as may be stored as subband full duplex configuration information 606) for configuring the UE for wireless communications via one or more links of a subband full duplex communication.

In some implementations, the subband frequency configuration pattern information may include information regarding one or more RB sets for one or more downlink subbands and one or more RB sets for one or more uplink subbands of a subband frequency configuration pattern used in implementing semi-static subband full duplex configuration. Subband full duplex configuration logic 605 may determine the RBs of one or more guard bands of the subband frequency configuration pattern from the configured downlink and uplink subbands of this example.

In some implementations, the subband frequency configuration pattern information may include information regarding one or more uplink/downlink patterns and start and end information for one or more guard bands of a subband frequency configuration patterns used in implementing semi-static subband full duplex configuration. Subband full duplex configuration logic 605 may determine the RBs of the downlink subbands and uplink subbands of the subband frequency configuration pattern from the configured guard bands of this example.

In some implementations, the subband frequency configuration pattern information may include information regarding start and end information for one or more guard bands and information indicating an uplink or downlink subband for one or more uplink/downlink patterns used in implementing semi-static subband full duplex configuration. Subband full duplex configuration logic 605 may determine the RBs of the downlink subbands and uplink subbands of the subband frequency configuration pattern from the configured guard bands of this example.

In some implementations, the subband symbol and slot time configuration pattern information may include information regarding a number of slots and/or symbols for each subband symbol and slot time configuration pattern, start symbol and end symbol for each subband symbol and slot time configuration pattern, etc. Subband full duplex configuration logic 605 may determine a time configuration for subband full duplex frequency patterns from information regarding the start symbol i and the end symbol j to be configured as subband full duplex symbols provided by the subband symbol and slot time configuration pattern information.

In operation according to some examples, subband full duplex configuration logic 605 may utilize the subband frequency configuration pattern information, the subband symbol and slot time configuration pattern information, and/or further information determined therefrom to determine one or more subband full duplex configurations to be semi-statically implemented by the UE. For example, the UE may semi-statically implement a subband full duplex communication session in accordance with the at least one subband frequency configuration pattern and the at least one subband symbol and slot time configuration pattern.

According to some examples, information in addition to the subband frequency configuration pattern information and subband symbol and slot time configuration pattern information (e.g., as may be received via RRC signaling 671 and/or stored as subband full duplex configuration information 606) may be utilized by subband full duplex configuration logic 605 in determining the one or more semi-static subband full duplex configurations to be implemented by the UE. For example, slot periodicity information, subband full duplex slot offset information, etc. may be utilized in determining a time configuration for subband full duplex frequency patterns of the one or more semi-static subband full duplex configurations.

In some implementations, the subband frequency configuration pattern information and subband symbol and slot time configuration pattern information may include information regarding preconfiguration of subband frequency configuration patterns and subband symbol and slot time configuration patterns used in implementing dynamic subband full duplex configuration. For example, the subband frequency configuration pattern information may include information for a first number (e.g. T1) of subband frequency configuration patterns and the subband symbol and slot time configuration pattern information may include information for a second number (e.g., T2) of subband symbol and slot time configuration patterns (e.g., as may be received via RRC signaling 671 and/or stored as subband full duplex configuration information 606), available for use by the UE for implementing one or more dynamic subband full duplex configurations. The information of the first number, T1, of subband frequency configuration patterns and the second number, T2, of subband symbol and slot time configuration patterns may be in the form of the examples described above with respect to the subband frequency configuration pattern information and subband symbol and slot time configuration pattern information used with respect to semi-static subband full duplex configurations. Accordingly, this information may be used similarly by subband full duplex configuration logic 605 in determining one or more subband full duplex configurations to be dynamically implemented by the UE. For example, the UE may dynamically implement a subband full duplex communication session in accordance with at least one subband frequency configuration pattern of the first number, T1, of subband frequency configuration patterns and at least one subband symbol and slot time configuration pattern of the second number, T2, of subband symbol and slot time configuration patterns.

One or more subband full duplex configurations implementing selected ones of the preconfigured downlink subbands, uplink subbands, and/or guard bands may be dynamically selected and/or activated via receiving signaling (e.g., MAC-CE signaling 672 and/or DCI signaling 673) by the UE. For example, the UE may receive MAC-CE signaling including subband frequency configuration pattern activation information for activating a subband frequency pattern in accordance with at least one subband frequency pattern of the first number, T1, of subband frequency configuration patterns and subband symbol and slot time configuration pattern activation information for activating a subband symbol and slot time configuration pattern of the second number, T2, of subband symbol and slot time configuration patterns. Additionally or alternatively, the UE may receive DCI signaling including subband frequency configuration pattern selection information for selecting a subband frequency pattern in accordance with at least one subband frequency pattern of the first number, T1, of subband frequency configuration patterns and subband symbol and slot time configuration pattern selection information for selecting a subband symbol and slot time configuration pattern of the second number, T2, of subband symbol and slot time configuration patterns. The foregoing MAC-CE and/or DCI signaling may further include information for the UE selecting a periodicity for subband full duplex communication.

In operation according to some examples, subband full duplex configuration logic 605 may utilize the subband frequency configuration pattern information, the subband symbol and slot time configuration pattern information, the subband frequency configuration pattern activation information, subband symbol and slot time configuration pattern activation information, and/or further information determined therefrom to determine one or more subband full duplex configurations to be dynamically implemented by the UE. For example, the UE may dynamically implement a subband full duplex communication session in accordance with the at least one subband frequency configuration pattern and the at least one subband symbol and slot time configuration pattern.

In block 1203, the UE communicates via at least one uplink or downlink of a subband full duplex communication session in accordance with the at least one subband frequency configuration pattern and the at least one subband symbol and slot time configuration pattern. For example, UE 115 may operate in a half duplex mode in accordance with the subband full duplex configuration to establish and/or maintain a subband full duplex communication session for communicating with a wireless communications device (e.g., base station 105) via one or more uplinks or one or more downlinks of the subband full duplex communication session. As another example, UE 115 may operate in a full duplex mode in accordance with the subband full duplex configuration to establish and/or maintain a subband full duplex communication session for communicating with one or more wireless communications devices via one or more uplinks and one or more downlinks of the subband full duplex communication session. Wireless communications devices correspondingly operating in accordance with the subband full duplex configuration to communicate with the UE via one or more uplinks and/or downlinks of the subband full duplex communication session may operate in a full duplex mode or a half duplex mode.

Figure 13:
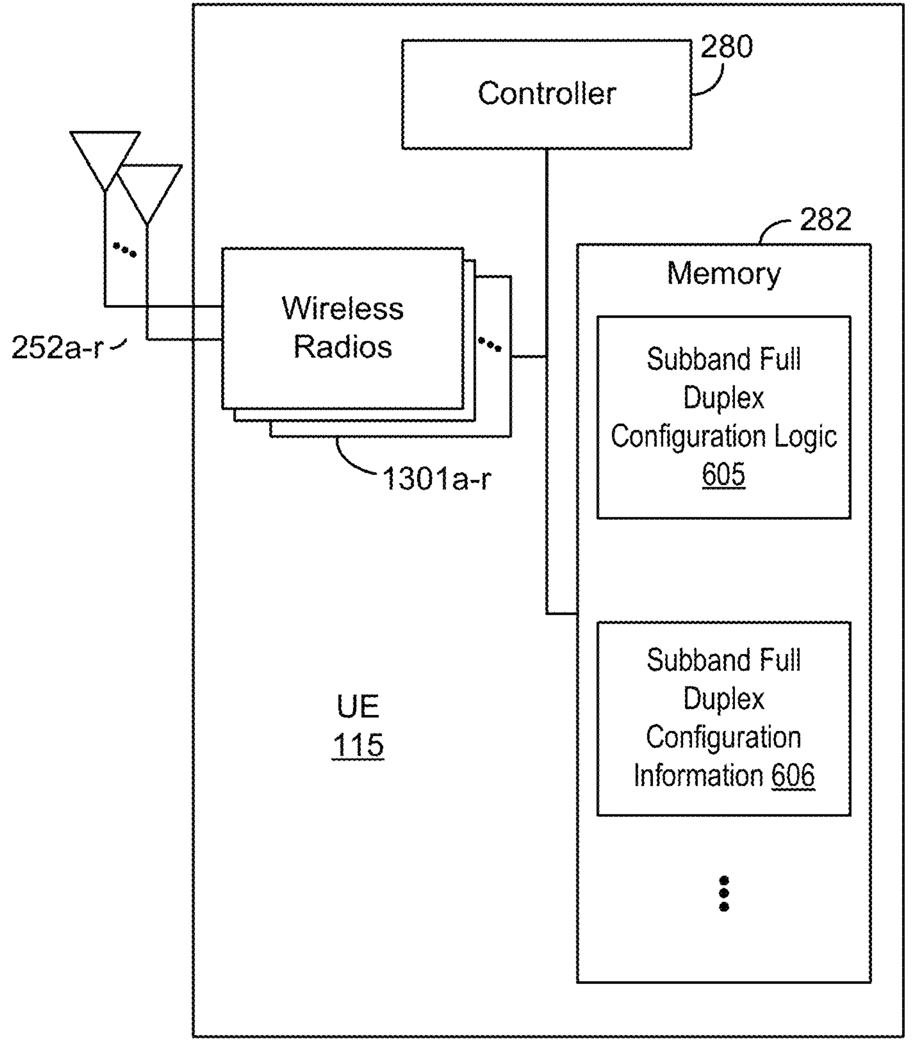
FIG. 13 is a block diagram of an example UE that supports subband full duplex configuration according to one or more aspects.

FIG. 13 is a block diagram of an example UE 115, such as may correspond to any of base stations 105 of FIGS. 1, 2, 5, and 6, that supports subband full duplex configuration (e.g., semi-static and/or dynamic configuration of one or more downlink subbands, one or more uplink subbands, and one or more guard bands) for wireless communication according to one or more aspects. UE 115 may be configured to perform operations, including the blocks of process 1100 described with reference to FIG. 11. In some implementations, UE 115 includes the structure, hardware, and components shown and described with reference to UE 115 of FIGS. 1, 2, 5, and 6. For example, UE 115 includes controller 280, which operates to execute logic or computer instructions stored in memory 282, as well as controlling the components of UE 115 that provide the features and functionality of UE 115. UE 115, under control of controller 280, transmits and receives signals via wireless radios 1301*a-r* and antennas 252*a-r*. Wireless radios 1301*a-r* include various components and hardware, as illustrated in FIG. 2 for UE 115, including modulator and demodulators 254*a-r*, MIMO detector 256, receive processor 258, transmit processor 264, and TX MIMO processor 266.

As shown, memory 282 may include subband full duplex configuration logic 605 and subband full duplex configuration information 606. Subband full duplex configuration logic 605 may be configured to control UE 115 and/or components thereof to perform functions of subband full duplex configuration and wireless communications, such as those described above with reference to FIGS. 6 and 12. Subband full duplex configuration information 606 may be configured to store various data, parameters, etc., such as subband frequency configuration pattern information, subband symbol and slot information, include slot periodicity information, information regarding multiple slot periodicity options, subband full duplex slot offset information, etc., utilized with respect to subband full duplex configuration and/or subband full duplex communications. UE 1115 may receive signals from and/or transmit signals to one or more network entities, such as base station 105 of FIGS. 1-3, 5, 6, and 10.

In some examples of methods, the apparatuses, and articles including non-transitory computer-readable medium described herein, various aspects of subband full duplex configuration for wireless communication may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for transmitting RRC signaling including subband frequency configuration pattern information for subband full duplex communication and subband symbol and slot time configuration pattern information for subband full duplex communication, and communicating via at least one uplink and at least one downlink of a subband full duplex communication session in accordance with at least one subband frequency configuration pattern corresponding to the subband frequency configuration pattern information and at least one subband symbol and slot time configuration pattern corresponding to the subband symbol and slot time configuration pattern information.

2. The methods, apparatuses, and articles of clause 1, wherein the subband frequency configuration pattern information includes RB set information for one or more downlink subbands of the subband full duplex communication and RB set information for one or more uplink subbands of the subband full duplex communication, wherein the at least one subband frequency configuration pattern comprises at least one guard band disposed between a downlink subband of the one or more downlink subbands and an uplink subband of the one or more uplink subbands, and wherein RBs of the at least one guard band comprise RB s between RB s of the RB set information for the one or more downlink subbands and RBs of the RB set information for the one or more uplink subbands.

3. The methods, apparatuses, and articles of any of clauses 1 or 2, wherein the subband frequency configuration pattern information includes a downlink and uplink pattern indicating alternate instances of downlink and uplink subbands for one or more downlink subbands and one or more uplink subbands of the subband full duplex communication and RB start and end information for one or more guard bands of the subband full duplex communication, and wherein the at least one subband frequency configuration pattern comprises one or more RB sets for one or more downlink subbands of the downlink and uplink pattern starting or ending adjacent to a RB of a respective guard band defined by the RB start and end information for the one or more guard bands and one or more RB sets for one or more uplink subbands of the downlink and uplink pattern starting or ending adjacent to a RB of a respective guard band defined by the RB start and end information for the one or more guard bands.

4. The methods, apparatuses, and articles of any of clauses 1-3, wherein the subband frequency configuration pattern information includes RB start and end information for one or more guard bands of the subband full duplex communication and downlink or uplink indication information for one or more downlink subbands or one or more uplink subbands of the subband full duplex communication, wherein the at least one subband frequency configuration pattern comprises one or more RB sets for one or more downlink subbands of the subband full duplex communication starting or ending adjacent to a RB of a respective guard band defined by the RB start and end information for the one or more guard bands and one or more RB sets for one or more uplink subbands of the subband full duplex communication starting or ending adjacent to a RB of a respective guard band defined by the RB start and end information for one or more guard bands, and wherein relative positioning of the one or more downlink subbands and the one or more uplink subbands is based on the downlink or uplink indication information.

5. The methods, apparatuses, and articles of any of clauses 1-4, wherein the subband frequency configuration pattern information includes RB start and end information for one or more uplink subbands of the subband full duplex communication, and wherein the at least one subband frequency configuration pattern comprises one or more RB sets for one or more guard bands of the subband full duplex communication starting or ending adjacent to a RB of a respective uplink subband defined by the RB start and end information for the one or more uplink subbands and one or more RB sets for one or more downlink subbands of the subband full duplex communication starting or ending adjacent to a RB of a respective guard band of the one or more guard bands.

6. The methods, apparatuses, and articles of clause 1, wherein the subband symbol and slot time configuration pattern information includes, for a subband full duplex communication window having M number of slots, start symbol and end symbol information per slot of the M number of slots of the subband full duplex communication window to be configured as subband full duplex symbols.

7. The methods, apparatuses, and articles of clause 6, wherein the at least one subband frequency configuration pattern includes a plurality of frequency configuration patterns, and wherein the M number of slots of the subband full duplex communication window include M1 number of slots of a first frequency configuration pattern of the at least one subband frequency configuration pattern and M2 number of slots of a second frequency configuration pattern of the at least one subband frequency configuration pattern.

8. The methods, apparatuses, and articles of any of clauses 1-7, wherein the RRC signaling indicates whether the subband frequency configuration pattern information and the subband symbol and slot time configuration pattern information is cell-common or is UE dedicated, and wherein if indicated as UE dedicated the RRC signaling indicates whether a configuration of the subband frequency configuration pattern information and the subband symbol and slot time configuration pattern information is applicable per BWP or CC or is applicable across all BWPs or CCs of a grant.

9. The methods, apparatuses, and articles of any of clauses 1-8, wherein the RRC signaling includes subband full duplex slot periodicity information for subband full duplex communication, and wherein the communicating via the at least one uplink and the at least one downlink of the subband full duplex communication session in accordance with the at least one subband frequency configuration pattern and the at least one subband symbol and slot time configuration pattern implements periodicity of the subband frequency configuration pattern in accordance with the subband full duplex slot periodicity information.

10. The methods, apparatuses, and articles of any of clauses 1-9, wherein the RRC signaling includes subband full duplex slot offset information for subband full duplex communication, and wherein the communicating via the at least one uplink and the at least one downlink of the subband full duplex communication session in accordance with the at least one subband frequency configuration pattern and the at least one subband symbol and slot time configuration pattern implements a start offset for the at least one subband frequency configuration pattern in accordance with the subband full duplex slot offset information.

11. The methods, apparatuses, and articles of any of clauses 1-10, wherein the subband frequency configuration pattern information includes information for a first number of subband frequency configuration patterns, and wherein the subband symbol and slot time configuration pattern information includes information for a second number of subband symbol and slot time configuration patterns, and wherein the communicating via the at least one uplink and the at least one downlink of the subband full duplex communication session in accordance with the at least one subband frequency configuration pattern and the at least one subband symbol and slot time configuration pattern implements a subband frequency pattern in accordance with at least one subband frequency pattern of the first number of subband frequency configuration patterns and implements at least one subband symbol and slot time configuration pattern in accordance with a subband symbol and slot time configuration pattern of the second number of subband symbol and slot time configuration patterns.

12. The methods, apparatuses, and articles of clause 11 may further provide for transmitting MAC-CE signaling including subband frequency configuration pattern activation information for a UE activating the subband frequency pattern in accordance with the at least one subband frequency pattern of the first number of subband frequency configuration patterns and subband symbol and slot time configuration pattern activation information for the UE activating the subband symbol and slot time configuration pattern of the second number of subband symbol and slot time configuration patterns for the communicating via the at least one uplink and the at least one downlink of the subband full duplex communication session, wherein the subband frequency pattern continues and repeats with one or more slots defined by the subband frequency pattern until subsequent MAC-CE signaling is transmitted for deactivating the subband frequency pattern.

13. The methods, apparatuses, and articles of clause 12, wherein the MAC-CE signaling includes subband full duplex slot offset information for subband full duplex communication, wherein the subband full duplex slot offset information defines a slot offset of a fourth number of slots or symbols after the MAC-CE signaling is received or after an ACK of the MAC-CE signaling is received, and wherein the communicating via the at least one uplink and the at least one downlink of the subband full duplex communication session in accordance with the at least one subband frequency configuration pattern and the at least one subband symbol and slot time configuration pattern implements a start offset for the at least one subband frequency configuration pattern in accordance with the subband full duplex slot offset information.

14. The methods, apparatuses, and articles of any of clauses 11-13 may further provide for transmitting DCI signaling including subband frequency configuration pattern selection information for a UE selecting the subband frequency pattern in accordance with the at least one subband frequency pattern of the first number of subband frequency configuration patterns and subband symbol and slot time configuration pattern selection information for the UE selecting the subband symbol and slot time configuration pattern of the second number of subband symbol and slot time configuration patterns for the communicating via the at least one uplink and the at least one downlink of the subband full duplex communication session.

15. The methods, apparatuses, and articles of clause 14, wherein the DCI signaling comprises a DCI format configured for scheduling downlink or uplink transmissions which has been modified to include the subband frequency configuration pattern selection information.

16. The methods, apparatuses, and articles of clause 15, wherein if the DCI signaling comprises a group common DCI the DCI format is modified to include a plurality fields indicating at least one subband frequency configuration pattern index and at least one subband symbol and slot time configuration index.

17. The methods, apparatuses, and articles of any of clauses 14 or 15, wherein the DCI signaling includes subband full duplex slot offset information for subband full duplex communication, wherein the subband full duplex slot offset information defines a slot offset of a fourth number of slots or symbols after the DCI signaling is received or after an ACK of the DCI signaling is received, wherein the communicating via the at least one uplink and the at least one downlink of the subband full duplex communication session in accordance with the at least one subband frequency configuration pattern and the at least one subband symbol and slot time configuration pattern implements a start offset for the at least one subband frequency configuration pattern in accordance with the subband full duplex slot offset information, and wherein the subband frequency pattern continues for one or more slots defined by the subband frequency pattern without repeating after the one or more slots.

18. The methods, apparatuses, and articles of any of clauses 1-17, wherein the RRC signaling includes information for a third number of subband full duplex slot periodicity options for implementing at least one subband frequency configuration pattern of a first number of subband frequency configuration patterns having a periodicity for the subband frequency configuration pattern in accordance with a periodicity option of the third number of subband full duplex slot periodicity options, the methods, apparatuses, and articles may further provide for transmitting MAC-CE signaling or DCI signaling including information for UE selecting the periodicity option.

19. Methods, apparatuses, and articles for wireless communication may provide for receiving RRC signaling including subband frequency configuration pattern information for subband full duplex communication and subband symbol and slot time configuration pattern information for subband full duplex communication, determining at least one subband frequency configuration pattern based on the subband frequency configuration pattern information and at least one subband symbol and slot time configuration pattern based on the subband symbol and slot time configuration pattern information, and communicating via at least one uplink or downlink of a subband full duplex communication session in accordance with the at least one subband frequency configuration pattern and the at least one subband symbol and slot time configuration pattern.

20. The methods, apparatuses, and articles of clause 19, wherein the subband frequency configuration pattern information includes RB set information for one or more downlink subbands of the subband full duplex communication and RB set information for one or more uplink subbands of the subband full duplex communication, and wherein determining the at least one subband frequency configuration pattern based on the subband frequency configuration pattern information may provide for determining at least one guard band disposed between a downlink subband of the one or more downlink subbands and an uplink subband of the one or more uplink subbands, wherein RB s of the at least one guard band comprise RB s between RB s of the RB set information for the one or more downlink subbands and RB s of the RB set information for the one or more uplink subbands.

21. The methods, apparatuses, and articles of any of clauses 19 or 20, wherein the subband frequency configuration pattern information includes a downlink and uplink pattern indicating alternate instances of downlink and uplink subbands for one or more downlink subbands and one or more uplink subbands of the subband full duplex communication and RB start and end information for one or more guard bands of the subband full duplex communication, and wherein determining the at least one subband frequency configuration pattern based on the subband frequency configuration pattern information may provide for determining one or more RB sets for one or more downlink subbands of the downlink and uplink pattern starting or ending adjacent to a RB of a respective guard band defined by the RB start and end information for the one or more guard bands and one or more RB sets for one or more uplink subbands of the downlink and uplink pattern starting or ending adjacent to a RB of a respective guard band defined by the RB start and end information for the one or more guard bands.

22. The methods, apparatuses, and articles of any of clauses 19-21, wherein the subband frequency configuration pattern information includes RB start and end information for one or more guard bands of the subband full duplex communication and downlink or uplink indication information for one or more downlink subbands or one or more uplink subbands of the subband full duplex communication, and wherein determining the at least one subband frequency configuration pattern based on the subband frequency configuration pattern information may provide for determining one or more RB sets for one or more downlink subbands of the subband full duplex communication starting or ending adjacent to a RB of a respective guard band defined by the RB start and end information for the one or more guard bands and one or more RB sets for one or more uplink subbands of the subband full duplex communication starting or ending adjacent to a RB of a respective guard band defined by the RB start and end information for one or more guard bands, and wherein relative positioning of the one or more downlink subbands and the one or more uplink subbands is based on the downlink or uplink indication information.

23. The methods, apparatuses, and articles of any of clauses 19-22, wherein the subband frequency configuration pattern information includes RB start and end information for one or more uplink subbands of the subband full duplex communication, and wherein determining the at least one subband frequency configuration pattern based on the subband frequency configuration pattern information may provide for determining one or more RB sets for one or more guard bands of the subband full duplex communication starting or ending adjacent to a RB of a respective uplink subband defined by the RB start and end information for the one or more uplink subbands, and determining one or more RB sets for one or more downlink subbands of the subband full duplex communication based upon the one or more RB sets determined for the one or more guard bands.

24. The methods, apparatuses, and articles of any of clauses 19-23, wherein the subband symbol and slot time configuration pattern information includes, for a subband full duplex communication window having M number of slots, start symbol and end symbol information per slot of the M number of slots of the subband full duplex communication window to be configured as subband full duplex symbols.

25. The methods, apparatuses, and articles of clause 24, wherein the at least one subband frequency configuration pattern includes a plurality of frequency configuration patterns, and wherein the M number of slots of the subband full duplex communication window include M1 number of slots of a first frequency configuration pattern of the at least one subband frequency configuration pattern and M2 number of slots of a second frequency configuration pattern of the at least one subband frequency configuration pattern.

26. The methods, apparatuses, and articles of any of clauses 19-25, wherein the RRC signaling includes subband full duplex slot periodicity information for subband full duplex communication, and wherein the communicating via the at least one uplink or downlink of the subband full duplex communication session in accordance with the at least one subband frequency configuration pattern and the at least one subband symbol and slot time configuration pattern implements periodicity of the subband frequency configuration pattern in accordance with the subband full duplex slot periodicity information.

27. The methods, apparatuses, and articles of any of clauses 19-26, wherein the RRC signaling includes subband full duplex slot offset information for subband full duplex communication, and wherein the communicating via the at least one uplink or downlink of the subband full duplex communication session in accordance with the at least one subband frequency configuration pattern and the at least one subband symbol and slot time configuration pattern implements a start offset for the at least one subband frequency configuration pattern in accordance with the subband full duplex slot offset information.

28. The methods, apparatuses, and articles of any of clauses 19-27, wherein the subband frequency configuration pattern information includes information for a first number of subband frequency configuration patterns, and wherein the subband symbol and slot time configuration pattern information includes information for a second number of subband symbol and slot time configuration patterns, and wherein the communicating via the at least one uplink or downlink of the subband full duplex communication session in accordance with the at least one subband frequency configuration pattern and the at least one subband symbol and slot time configuration pattern implements a subband frequency pattern in accordance with at least one subband frequency pattern of the first number of subband frequency configuration patterns and implements at least one subband symbol and slot time configuration pattern in accordance with a subband symbol and slot time configuration pattern of the second number of subband symbol and slot time configuration patterns.

29. The methods, apparatuses, and articles of clause 28 may further provide for receiving MAC-CE signaling including subband frequency configuration pattern activation information for activating the subband frequency pattern in accordance with the at least one subband frequency pattern of the first number of subband frequency configuration patterns and subband symbol and slot time configuration pattern activation information for activating the subband symbol and slot time configuration pattern of the second number of subband symbol and slot time configuration patterns for the communicating via the at least one uplink or downlink of the subband full duplex communication session, wherein the subband frequency pattern is continued and repeated with one or more slots defined by the subband frequency pattern until subsequent MAC-CE signaling is received and deactivates the subband frequency pattern.

30. The methods, apparatuses, and articles of clause 29, wherein the MAC-CE signaling includes subband full duplex slot offset information for subband full duplex communication, wherein the subband full duplex slot offset information defines a slot offset of a fourth number of slots or symbols after the MAC-CE signaling is received or after an ACK of the MAC-CE signaling is received, and wherein the communicating via the at least one uplink or downlink of the subband full duplex communication session in accordance with the at least one subband frequency configuration pattern and the at least one subband symbol and slot time configuration pattern implements a start offset for the at least one subband frequency configuration pattern in accordance with the subband full duplex slot offset information.

31. The methods, apparatuses, and articles of any of clauses 28-30 may further provide for receiving DCI signaling including subband frequency configuration pattern selection information for selecting the subband frequency pattern in accordance with the at least one subband frequency pattern of the first number of subband frequency configuration patterns and subband symbol and slot time configuration pattern selection information for selecting the subband symbol and slot time configuration pattern of the second number of subband symbol and slot time configuration patterns for the communicating via the at least one uplink or downlink of the subband full duplex communication session.

32. The methods, apparatuses, and articles of clause 31, wherein the DCI signaling includes subband full duplex slot offset information for subband full duplex communication, wherein the subband full duplex slot offset information defines a slot offset of a fourth number of slots or symbols after the DCI signaling is received or after an ACK of the DCI signaling is received, wherein the communicating via the at least one uplink or downlink of the subband full duplex communication session in accordance with the at least one subband frequency configuration pattern and the at least one subband symbol and slot time configuration pattern implements a start offset for the at least one subband frequency configuration pattern in accordance with the subband full duplex slot offset information, and wherein the subband frequency pattern is continued for one or more slots defined by the subband frequency pattern without repeating after the one or more slots.

33. The methods, apparatuses, and articles of any of clauses 19-32, wherein the RRC signaling includes information for a third number of subband full duplex slot periodicity options for implementing at least one subband frequency pattern of a first number of subband frequency configuration patterns having a periodicity for the subband frequency configuration pattern in accordance with a periodicity option of the third number of subband full duplex slot periodicity options, the method further comprising:

receiving MAC-CE signaling or DCI signaling including information for a UE selecting the periodicity option.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-3, 5, 6, 10 and 12 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a network element, the method comprising:

transmitting radio resource control (RRC) signaling including subband frequency configuration pattern information for subband full duplex communication and subband symbol and slot time configuration pattern information for subband full duplex communication, wherein the subband frequency configuration pattern information includes information for a first number of subband frequency configuration patterns, and wherein the subband symbol and slot time configuration pattern information includes information for a second number of subband symbol and slot time configuration patterns; and communicating via at least one uplink and at least one downlink of a subband full duplex communication session in accordance with at least one subband frequency configuration pattern corresponding to the subband frequency configuration pattern information and at least one subband symbol and slot time configuration pattern corresponding to the subband symbol and slot time configuration pattern information, wherein the communicating via the at least one uplink and the at least one downlink of the subband full duplex communication session in accordance with the at least one subband frequency configuration pattern and the at least one subband symbol and slot time configuration pattern implements a subband frequency pattern in accordance with at least one subband frequency pattern of the first number of subband frequency configuration patterns and implements at least one subband symbol and slot time configuration pattern in accordance with a subband symbol and slot time configuration pattern of the second number of subband symbol and slot time configuration patterns.

2. The method of claim 1, wherein the subband frequency configuration pattern information includes resource block (RB) set information for one or more downlink subbands of the subband full duplex communication and RB set information for one or more uplink subbands of the subband full duplex communication, wherein the at least one subband frequency configuration pattern comprises at least one guard band disposed between a downlink subband of the one or more downlink subbands and an uplink subband of the one or more uplink subbands, and wherein RBs of the at least one guard band comprise RBs between RBs of the RB set information for the one or more downlink subbands and RBs of the RB set information for the one or more uplink subbands.

3. The method of claim 1, wherein the subband frequency configuration pattern information includes a downlink and uplink pattern indicating alternate instances of downlink and uplink subbands for one or more downlink subbands and one or more uplink subbands of the subband full duplex communication and resource block (RB) start and end information for one or more guard bands of the subband full duplex communication, and wherein the at least one subband frequency configuration pattern comprises one or more RB sets for one or more downlink subbands of the downlink and uplink pattern starting or ending adjacent to a RB of a respective guard band defined by the RB start and end information for the one or more guard bands and one or more RB sets for one or more uplink subbands of the downlink and uplink pattern starting or ending adjacent to a RB of a respective guard band defined by the RB start and end information for the one or more guard bands.

4. The method of claim 1, wherein the subband frequency configuration pattern information includes resource block (RB) start and end information for one or more guard bands of the subband full duplex communication and downlink or uplink indication information for one or more downlink subbands or one or more uplink subbands of the subband full duplex communication, wherein the at least one subband frequency configuration pattern comprises one or more RB sets for one or more downlink subbands of the subband full duplex communication starting or ending adjacent to a RB of a respective guard band defined by the RB start and end information for the one or more guard bands and one or more RB sets for one or more uplink subbands of the subband full duplex communication starting or ending adjacent to a RB of a respective guard band defined by the RB start and end information for one or more guard bands, and wherein relative positioning of the one or more downlink subbands and the one or more uplink subbands is based on the downlink or uplink indication information.

5. The method of claim 1, wherein the subband frequency configuration pattern information includes resource block (RB) start and end information for one or more uplink subbands of the subband full duplex communication, and wherein the at least one subband frequency configuration pattern comprises one or more RB sets for one or more guard bands of the subband full duplex communication starting or ending adjacent to a RB of a respective uplink subband defined by the RB start and end information for the one or more uplink subbands and one or more RB sets for one or more downlink subbands of the subband full duplex communication starting or ending adjacent to a RB of a respective guard band of the one or more guard bands.

6. The method of claim 1, wherein the subband symbol and slot time configuration pattern information includes, for a subband full duplex communication window having M number of slots, start symbol and end symbol information per slot of the M number of slots of the subband full duplex communication window to be configured as subband full duplex symbols.

7. The method of claim 6, wherein the at least one subband frequency configuration pattern includes a plurality of frequency configuration patterns, and wherein the M number of slots of the subband full duplex communication window include M1 number of slots of a first frequency configuration pattern of the at least one subband frequency configuration pattern and M2 number of slots of a second frequency configuration pattern of the at least one subband frequency configuration pattern.

8. The method of claim 1, wherein the RRC signaling includes subband full duplex slot periodicity information for subband full duplex communication, and wherein the communicating via the at least one uplink and the at least one downlink of the subband full duplex communication session in accordance with the at least one subband frequency configuration pattern and the at least one subband symbol and slot time configuration pattern implements periodicity of the subband frequency configuration pattern in accordance with the subband full duplex slot periodicity information.

9. The method of claim 1, wherein the RRC signaling includes subband full duplex slot offset information for subband full duplex communication, and wherein the communicating via the at least one uplink and the at least one downlink of the subband full duplex communication session in accordance with the at least one subband frequency configuration pattern and the at least one subband symbol and slot time configuration pattern implements a start offset for the at least one subband frequency configuration pattern in accordance with the subband full duplex slot offset information.

10. The method of claim 1, further comprising:

transmitting media access control-control element (MAC-CE) signaling including subband frequency configuration pattern activation information for a user equipment (UE) activating the subband frequency pattern in accordance with the at least one subband frequency pattern of the first number of subband frequency configuration patterns and subband symbol and slot time configuration pattern activation information for the UE activating the subband symbol and slot time configuration pattern of the second number of subband symbol and slot time configuration patterns for the communicating via the at least one uplink and the at least one downlink of the subband full duplex communication session, wherein the subband frequency pattern continues and repeats with one or more slots defined by the subband frequency pattern until subsequent MAC-CE signaling is transmitted for deactivating the subband frequency pattern.

11. The method of claim 10, wherein the MAC-CE signaling includes subband full duplex slot offset information for subband full duplex communication, wherein the subband full duplex slot offset information defines a slot offset of a fourth number of slots or symbols after the MAC-CE signaling is received or after an acknowledgement (ACK) of the MAC-CE signaling is received, and wherein the communicating via the at least one uplink and the at least one downlink of the subband full duplex communication session in accordance with the at least one subband frequency configuration pattern and the at least one subband symbol and slot time configuration pattern implements a start offset for the at least one subband frequency configuration pattern in accordance with the subband full duplex slot offset information.

12. The method of claim 1, further comprising:

transmitting downlink control information (DCI) signaling including subband frequency configuration pattern selection information for a user equipment (UE) selecting the subband frequency pattern in accordance with the at least one subband frequency pattern of the first number of subband frequency configuration patterns and subband symbol and slot time configuration pattern selection information for the UE selecting the subband symbol and slot time configuration pattern of the second number of subband symbol and slot time configuration patterns for the communicating via the at least one uplink and the at least one downlink of the subband full duplex communication session.

13. The method of claim 12, wherein the DCI signaling includes subband full duplex slot offset information for subband full duplex communication, wherein the subband full duplex slot offset information defines a slot offset of a fourth number of slots or symbols after the DCI signaling is received or after an acknowledgement (ACK) of the DCI signaling is received, wherein the communicating via the at least one uplink and the at least one downlink of the subband full duplex communication session in accordance with the at least one subband frequency configuration pattern and the at least one subband symbol and slot time configuration pattern implements a start offset for the at least one subband frequency configuration pattern in accordance with the subband full duplex slot offset information, and wherein the subband frequency pattern continues for one or more slots defined by the subband frequency pattern without repeating after the one or more slots.

14. The method of claim 1, wherein the RRC signaling includes information for a third number of subband full duplex slot periodicity options for implementing at least one subband frequency configuration pattern of a first number of subband frequency configuration patterns having a periodicity for the subband frequency configuration pattern in accordance with a periodicity option of the third number of subband full duplex slot periodicity options, the method further comprising:

transmitting media access control-control element (MAC-CE) signaling or downlink control information (DCI) signaling including information for a user equipment (UE) selecting the periodicity option.

15. A method of wireless communication performed by a user equipment (UE), the method comprising:

receiving radio resource control (RRC) signaling including subband frequency configuration pattern information for subband full duplex communication and subband symbol and slot time configuration pattern information for subband full duplex communication, wherein the subband frequency configuration pattern information includes information for a first number of subband frequency configuration patterns, and wherein the subband symbol and slot time configuration pattern information includes information for a second number of subband symbol and slot time configuration patterns;

determining at least one subband frequency configuration pattern based on the subband frequency configuration pattern information and at least one subband symbol and slot time configuration pattern based on the subband symbol and slot time configuration pattern information; and communicating via at least one uplink or downlink of a subband full duplex communication session in accordance with the at least one subband frequency configuration pattern and the at least one subband symbol and slot time configuration pattern, wherein the communicating via the at least one uplink or downlink of the subband full duplex communication session in accordance with the at least one subband frequency configuration pattern and the at least one subband symbol and slot time configuration pattern implements a subband frequency pattern in accordance with at least one subband frequency pattern of the first number of subband frequency configuration patterns and implements at least one subband symbol and slot time configuration pattern in accordance with a subband symbol and slot time configuration pattern of the second number of subband symbol and slot time configuration patterns.

16. The method of claim 15, wherein the subband frequency configuration pattern information includes resource block (RB) set information for one or more downlink subbands of the subband full duplex communication and RB set information for one or more uplink subbands of the subband full duplex communication, and wherein determining the at least one subband frequency configuration pattern based on the subband frequency configuration pattern information comprises:

determining at least one guard band disposed between a downlink subband of the one or more downlink subbands and an uplink subband of the one or more uplink subbands, wherein RBs of the at least one guard band comprise RBs between RBs of the RB set information for the one or more downlink subbands and RBs of the RB set information for the one or more uplink subbands.

17. The method of claim 15, wherein the subband frequency configuration pattern information includes a downlink and uplink pattern indicating alternate instances of downlink and uplink subbands for one or more downlink subbands and one or more uplink subbands of the subband full duplex communication and resource block (RB) start and end information for one or more guard bands of the subband full duplex communication, and wherein determining the at least one subband frequency configuration pattern based on the subband frequency configuration pattern information comprises:

determining one or more RB sets for one or more downlink subbands of the downlink and uplink pattern starting or ending adjacent to a RB of a respective guard band defined by the RB start and end information for the one or more guard bands and one or more RB sets for one or more uplink subbands of the downlink and uplink pattern starting or ending adjacent to a RB of a respective guard band defined by the RB start and end information for the one or more guard bands.

18. The method of claim 15, wherein the subband frequency configuration pattern information includes resource block (RB) start and end information for one or more guard bands of the subband full duplex communication and downlink or uplink indication information for one or more downlink subbands or one or more uplink subbands of the subband full duplex communication, and wherein determining the at least one subband frequency configuration pattern based on the subband frequency configuration pattern information comprises:

determining one or more RB sets for one or more downlink subbands of the subband full duplex communication starting or ending adjacent to a RB of a respective guard band defined by the RB start and end information for the one or more guard bands and one or more RB sets for one or more uplink subbands of the subband full duplex communication starting or ending adjacent to a RB of a respective guard band defined by the RB start and end information for one or more guard bands, and wherein relative positioning of the one or more downlink subbands and the one or more uplink subbands is based on the downlink or uplink indication information.

19. The method of claim 15, wherein the subband frequency configuration pattern information includes resource block (RB) start and end information for one or more uplink subbands of the subband full duplex communication, and wherein determining the at least one subband frequency configuration pattern based on the subband frequency configuration pattern information comprises:

determining one or more RB sets for one or more guard bands of the subband full duplex communication starting or ending adjacent to a RB of a respective uplink subband defined by the RB start and end information for the one or more uplink subbands; and determining one or more RB sets for one or more downlink subbands of the subband full duplex communication based upon the one or more RB sets determined for the one or more guard bands.

20. The method of claim 15, wherein the subband symbol and slot time configuration pattern information includes, for a subband full duplex communication window having M number of slots, start symbol and end symbol information per slot of the M number of slots of the subband full duplex communication window to be configured as subband full duplex symbols.

21. The method of claim 20, wherein the at least one subband frequency configuration pattern includes a plurality of frequency configuration patterns, and wherein the M number of slots of the subband full duplex communication window include MI number of slots of a first frequency configuration pattern of the at least one subband frequency configuration pattern and M2 number of slots of a second frequency configuration pattern of the at least one subband frequency configuration pattern.

22. The method of claim 15, wherein the RRC signaling includes subband full duplex slot periodicity information for subband full duplex communication, and wherein the communicating via the at least one uplink or downlink of the subband full duplex communication session in accordance with the at least one subband frequency configuration pattern and the at least one subband symbol and slot time configuration pattern implements periodicity of the subband frequency configuration pattern in accordance with the subband full duplex slot periodicity information.

23. The method of claim 15, wherein the RRC signaling includes subband full duplex slot offset information for subband full duplex communication, and wherein the communicating via the at least one uplink or downlink of the subband full duplex communication session in accordance with the at least one subband frequency configuration pattern and the at least one subband symbol and slot time configuration pattern implements a start offset for the at least one subband frequency configuration pattern in accordance with the subband full duplex slot offset information.

24. The method of claim 15, further comprising:

receiving media access control-control element (MAC-CE) signaling including subband frequency configuration pattern activation information for activating the subband frequency pattern in accordance with the at least one subband frequency pattern of the first number of subband frequency configuration patterns and subband symbol and slot time configuration pattern activation information for activating the subband symbol and slot time configuration pattern of the second number of subband symbol and slot time configuration patterns for the communicating via the at least one uplink or downlink of the subband full duplex communication session, wherein the subband frequency pattern is continued and repeated with one or more slots defined by the subband frequency pattern until subsequent MAC-CE signaling is received and deactivates the subband frequency pattern.

25. The method of claim 15, wherein the MAC-CE signaling includes subband full duplex slot offset information for subband full duplex communication, wherein the subband full duplex slot offset information defines a slot offset of a fourth number of slots or symbols after the MAC-CE signaling is received or after an acknowledgement (ACK) of the MAC-CE signaling is received, and wherein the communicating via the at least one uplink or downlink of the subband full duplex communication session in accordance with the at least one subband frequency configuration pattern and the at least one subband symbol and slot time configuration pattern implements a start offset for the at least one subband frequency configuration pattern in accordance with the subband full duplex slot offset information.

26. The method of claim 15, further comprising:

receiving downlink control information (DCI) signaling including subband frequency configuration pattern selection information for selecting the subband frequency pattern in accordance with the at least one subband frequency pattern of the first number of subband frequency configuration patterns and subband symbol and slot time configuration pattern selection information for selecting the subband symbol and slot time configuration pattern of the second number of subband symbol and slot time configuration patterns for the communicating via the at least one uplink or downlink of the subband full duplex communication session.

27. The method of claim 26, wherein the DCI signaling includes subband full duplex slot offset information for subband full duplex communication, wherein the subband full duplex slot offset information defines a slot offset of a fourth number of slots or symbols after the DCI signaling is received or after an acknowledgment (ACK) of the DCI signaling is received, wherein the communicating via the at least one uplink or downlink of the subband full duplex communication session in accordance with the at least one subband frequency configuration pattern and the at least one subband symbol and slot time configuration pattern implements a start offset for the at least one subband frequency configuration pattern in accordance with the subband full duplex slot offset information, and wherein the subband frequency pattern is continued for one or more slots defined by the subband frequency pattern without repeating after the one or more slots.

28. The method of claim 15, wherein the RRC signaling includes information for a third number of subband full duplex slot periodicity options for implementing at least one subband frequency pattern of a first number of subband frequency configuration patterns having a periodicity for the subband frequency configuration pattern in accordance with a periodicity option of the third number of subband full duplex slot periodicity options, the method further comprising:

receiving media access control-control element (MAC-CE) signaling or downlink control information (DCI) signaling including information for a user equipment (UE) selecting the periodicity option.

* * * * *